US011381690B2

(12) United States Patent
Kawano

(10) Patent No.: US 11,381,690 B2
(45) Date of Patent: Jul. 5, 2022

(54) MACHINE LEARNING DEVICE INCLUDING A STATE VARIABLE ACQUISITION UNIT, A TEACHING DATA ACQUISITION UNIT AND A LEARNED MODEL GENERATION UNIT THAT GENERATES A FIRST LEARNED MODEL BY PERFORMING MACHINE LEARNING BASED ON A FIRST STATE VARIABLE DATASET AND FIRST TEACHING DATA AND GENERATES A SECOND LEARNED MODEL BY PERFORMING MACHINE LEARNING BASED ON A SECOND STATE VARIABLE DATASET AND SECOND TEACHING DATA

(71) Applicant: Oki Data Corporation, Tokyo (JP)

(72) Inventor: Akimitsu Kawano, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 17/125,433

(22) Filed: Dec. 17, 2020

(65) Prior Publication Data

US 2021/0195033 A1 Jun. 24, 2021

(30) Foreign Application Priority Data

Dec. 20, 2019 (JP) .............................. JP2019-230473

(51) Int. Cl.
*H04N 1/00* (2006.01)
*G06T 7/00* (2017.01)
(Continued)

(52) U.S. Cl.
CPC ........... *H04N 1/00076* (2013.01); *G06N 3/08* (2013.01); *G06T 7/0002* (2013.01);
(Continued)

(58) Field of Classification Search
CPC .... G06F 3/1204; G06F 3/1208; G06F 3/1215; G06N 3/08; G06T 2207/20081;
(Continued)

(56) References Cited

U.S. PATENT DOCUMENTS

| 9,037,013 | B2* | 5/2015 | Kitamoto ........... G03G 15/5029 399/45 |
| 11,003,398 | B2* | 5/2021 | Caliendo, Jr. ........... G06F 3/121 |

(Continued)

FOREIGN PATENT DOCUMENTS

JP        H9-329994 A    12/1997

*Primary Examiner* — Chad Dickerson
(74) *Attorney, Agent, or Firm* — Metrolex IP Law Group, PLLC

(57) ABSTRACT

A machine learning device according to an embodiment may include: a state variable acquisition unit that acquires first and second state variable datasets including print results performed at first and second printing speeds respectively by an image formation apparatus; a teaching data acquisition unit that acquires first and second teaching data corresponding to the first and second printing speeds; and a learned model generation unit that generates a first learned model by performing machine learning based on the first state variable dataset and the first teaching data, and generates a second learned model by performing machine learning based on the second state variable dataset and the second teaching data. Each of the first and second state variable datasets includes: feature value information; medium information; and first control information. Each of the first and second teaching data includes: second control information; and a print defect value.

8 Claims, 15 Drawing Sheets

(51) Int. Cl.
*G06N 3/08* (2006.01)
*G06F 3/12* (2006.01)

(52) U.S. Cl.
CPC ..... *H04N 1/00058* (2013.01); *H04N 1/00068* (2013.01); *H04N 1/00657* (2013.01); *G06T 2207/20081* (2013.01); *G06T 2207/30144* (2013.01)

(58) Field of Classification Search
CPC . G06T 2207/20084; G06T 2207/30144; G06T 7/0002; G06T 7/0004; H04N 1/00058; H04N 1/00068; H04N 1/00076; H04N 1/00657
USPC .................................. 358/1.11–1.18; 382/103
See application file for complete search history.

(56) References Cited

U.S. PATENT DOCUMENTS

| | | | |
|---|---|---|---|
| 11,055,032 B2 * | 7/2021 | Shinkai | G06N 3/08 |
| 11,068,216 B2 * | 7/2021 | Ishi | G06F 3/122 |
| 2020/0244816 A1 * | 7/2020 | Ukita | G06N 3/088 |

* cited by examiner

FIG. 5

| | THIN PRINT MEDIA PM | | MEDIUM-THICKNESS PRINT MEDIA PM | | THICK PRINT MEDIA PM | |
|---|---|---|---|---|---|---|
| | PRINTING SPEED SPA | PRINTING SPEED SPB | PRINTING SPEED SPA | PRINTING SPEED SPB | PRINTING SPEED SPA | PRINTING SPEED SPB |
| CASE OF GENERATING SINGLE LEARNED MODEL 421 COMMON TO TWO PRINTING SPEEDS SPA AND SPB | DATA REQUIRED | DATA REQUIRED | DATA REQUIRED | DATA REQUIRED | DATA REQUIRED | DATA REQUIRED |
| CASE OF GENERATING TWO LEARNED MODELS 421A AND 421B CORRESPONDING TO TWO PRINTING SPEEDS SPA AND SPB RESPECTIVELY | DATA REQUIRED | — | DATA REQUIRED | DATA REQUIRED | — | DATA REQUIRED |

MACHINE LEARNING DEVICE INCLUDING A STATE VARIABLE ACQUISITION UNIT, A TEACHING DATA ACQUISITION UNIT AND A LEARNED MODEL GENERATION UNIT THAT GENERATES A FIRST LEARNED MODEL BY PERFORMING MACHINE LEARNING BASED ON A FIRST STATE VARIABLE DATASET AND FIRST TEACHING DATA AND GENERATES A SECOND LEARNED MODEL BY PERFORMING MACHINE LEARNING BASED ON A SECOND STATE VARIABLE DATASET AND SECOND TEACHING DATA

CROSS REFERENCE TO RELATED APPLICATIONS

This application claims priority based on 35 USC 119 from prior Japanese Patent Application No. 2019-230473 filed on Dec. 20, 2019, entitled "MACHINE LEARNING DEVICE, DATA PROCESSING SYSTEM, MACHINE LEARNING METHOD, AND DATA PROCESSING METHOD", the entire contents of which are incorporated herein by reference.

BACKGROUND

This disclosure may relate to a machine learning device and a machine learning method for learning correlations between control information of an image formation apparatus and a printed material output by the image formation apparatus, and a data processing system and a data processing method using a learned model obtained by the machine learning device and the machine learning method.

An electrophotographic image formation apparatus, such as a copier, a printer, and a multifunctional machine, is widely used in office environments, for example. In recent years, an electrophotographic image formation apparatus has also been used to meet the needs of printing (hereinafter also referred to as "industrial printing") specialized for a specific business in a specific industry in industrial fields such as the medical field, the manufacturing industry, the distribution industry, or the like.

The industrial printing can include, for example, package printing of products, label printing on bottles such as wine bottles, etc., or printing of wedding invitations. As can be seen from the above examples, the quality (image quality) of printed materials in the industrial printing has a significant impact on the value of the product or service in many cases. For this reason, when it comes to the printed materials in the industrial printing, the print quality is of particular importance.

Such industrial printing is different from printing using general paper (A4, B4, Letter size plain paper, etc.) usually carried out in offices and the like. In the industrial printing, special media, such as cardboard, long paper, Japanese paper, paperboard, western paper, film, labels, envelopes, etc., are used depending on the purpose and use for which they are used. When printing on such a wide variety of media (hereinafter may be collectively referred to as "print media") using a common image formation apparatus, the control information (control parameters) for the image formation apparatus at the time of printing needs to be adjusted to suit a print medium to be used.

For example, Patent Document 1 discloses an electrophotographic image formation apparatus that accepts user's input through a paper selection key set for each paper according to the thickness of the paper, such as thin, medium, normal, thick, etc., and sets a transfer voltage and a fixing temperature according to the user's input through the paper selection key. In this method, the control information can be adjusted according to the paper thickness.

Patent Document 1: Japanese Patent Application Publication No. H09-329994

SUMMARY

It may be expected that an image formation apparatus improves the print quality.

It may be also expected to provide a machine learning device, a data processing system, a machine learning method, and a data processing method that can improve the print quality.

A machine learning device according to an embodiment of the disclosure may include a state variable acquisition unit, a teaching data acquisition unit, and a learned model generation unit. The state variable acquisition unit is configured to acquire a first state variable dataset including a print result at a first printing speed by an image formation apparatus, and a second state variable dataset including a print result at a second printing speed by the image formation apparatus, wherein the image formation apparatus is capable of printing at a plurality of printing speeds including the first printing speed and the second printing speed. The teaching data acquisition unit is configured to acquire first teaching data corresponding to the first printing speed and second teaching data corresponding to the second printing speed. The learned model generation unit is configured to generate a first learned model by performing machine learning based on the first state variable dataset and the first teaching data, and generates a second learned model by performing machine learning based on the second state variable dataset and the second teaching data. Each of the first state variable dataset and the second state variable dataset includes: feature value information in an actual printout in which printing is actually made; medium information, which is information of a print medium used to output the actual printout; and first control information, which is control information of the image formation apparatus when the image formation apparatus outputs the actual printout. Each of the first teaching data and the second teaching data includes: second control information, which is control information such that the feature value information become less than or equal to a predetermined threshold when the printing is made at an corresponding one of the first and second printing speeds; and a print defect value in a case of printing at the corresponding printing speed using the second control information.

A data processing system according to an embodiment of the disclosure may include an actual printout information acquisition unit, a data processing unit, and a control information storage unit. The actual printout information acquisition unit is configured to acquire a first dataset including a print result at a first printing speed by an image formation apparatus, and a second dataset including a print result at a second printing speed by the image formation apparatus, wherein the image formation apparatus is capable of printing at a plurality of printing speeds including the first printing speed and the second printing speed. The data processing unit is configured to output third control information based on the first dataset, the second dataset, a first learned model for the first printing speed and a second learned model for the second printing speed. The control information storage unit is configured to store therein the third control information output from the data processing unit. Each of the first dataset and the second dataset includes: feature value information in an actual printout in which printing is actually made; medium information, which is information of a print medium used to output the actual printout; and first control information, which is control information of the image formation apparatus when the image formation apparatus outputs the actual printout. The data processing unit is configured to: input information contained in the first dataset into the first learned model, to calculate control information of the image formation apparatus by the first learned model and a print defect value in a case of printing using the control information calculated by the first learned model; input information contained in the second dataset into the second learned model, to calculate control information of the image formation apparatus by using the second learned model and a print defect value in a case of printing using the control information calculated by the second learned model; output, when the print defect value calculated by the first learned model is less than the print defect value calculated by the second learned model, a third control information that includes the control information calculated by the first learned model and speed control information indicating the first print speed; and output, when the print defect value calculated by the second learned model is less than the print defect value calculated by the first learned model, a third control information that includes the control information calculated by the second learned model and speed control information indicating the second print speed.

A machine learning method according to an embodiment of the disclosure may include: a first processing, executed by a computer, of acquiring a first state variable dataset including a print result at a first printing speed by an image formation apparatus, and a second state variable dataset including a print result at a second printing speed by the image formation apparatus, wherein the image formation apparatus is capable of printing at a plurality of printing speeds including the first printing speed and the second printing speed; a second processing, executed by the computer, of obtaining first teaching data corresponding to the first printing speed and second teaching data corresponding to the second printing speed; and a third processing, executed by the computer, of generating a first learned model by performing machine learning based on the first state variable dataset and the first teaching data, and generating a second learned model by performing machine learning based on the second state variable dataset and the second teaching data. Each of the first state variable dataset and the second state variable dataset includes: feature value information in an actual printout in which printing is actually made; medium information, which is information of a print medium used to output the actual printout; and first control information, which is control information of the image formation apparatus when the image formation apparatus outputs the actual printout. Each of the first teaching data and the second teaching data includes: second control information, which is control information such that the feature value information become less than or equal to a predetermined threshold when the printing is made at an corresponding one of the first and second printing speeds; and a print defect value in a case of printing at the corresponding printing speed using the second control information.

A data processing method according to an embodiment of the disclosure may include: a first data processing, executed by a computer, of acquiring a first dataset including a print result at a first printing speed by an image formation apparatus, and a second dataset including a print result at a second printing speed by the image formation apparatus, wherein the image formation apparatus is capable of printing at a plurality of printing speeds including the first printing speed and the second printing speed; a second data processing, executed by the computer, of outputting third control information based on the first dataset, the second dataset, and first learned model for the first printing speed and a second learned model for the second printing speed; and a third data processing, executed by the computer, of storing the third control information output. Each of the first dataset and the second dataset includes: feature value information in an actual printout in which printing is actually made; medium information, which is information of a print medium used to output the actual printout; and first control information, which is control information of the image formation apparatus when the image formation apparatus outputs the actual printout. The second data processing includes: inputting information contained in the first dataset into the first learned model, to thereby calculate control information of the image formation apparatus by the first learned model and a print defect value in a case of printing using the control information calculated by the first learned model; inputting information contained in the second dataset into the second learned model, to thereby calculate control information of the image formation apparatus by the second learned model and a print defect value in a case of printing using the control information calculated by the second learned model; outputting, when the print defect value calculated by the first learned model is less than the print defect value calculated by the second learned model, the third control information that includes the control information calculated by the first learned model and speed control information indicating the first printing speed; and outputting, when the print defect value calculated by the second learned model is less than the print defect value calculated by the first learned model, the third control information that includes the control information calculated by the second learned model and speed control information indicating the second printing speed.

According to the machine learning device and the machine learning method according to an embodiment, the first learned model is generated by performing the machine learning based on the first state variable dataset including the print result at the first printing speed and the first teaching data corresponding to the first printing speed, and the second learned is generated by performing the machine learning based on the second state variable dataset including the print result at the second printing speed and the second teaching data corresponding to the second printing speed. Accordingly, the print quality can be improved.

According to the data processing system and the data processing method according to an embodiment, when the print defect value calculated by the first learned model corresponding to the first printing speed is less than the print defect value calculated by the second learned model corresponding to the second printing speed, the third control information is output that includes the control information calculated by the first learned model and the speed control information indicating the first printing speed, and when the print defect value calculated by the second learned model corresponding to the second printing speed is less than the print defect value calculated by the first learned model corresponding to the first printing speed, the third control information is output that includes the control information calculated by the second learned and the speed control information indicating the second printing speed. Accordingly, the print quality can be improved.

BRIEF DESCRIPTION OF DRAWINGS

FIG. 5 is a table illustrating an example of data to perform machine learning.

DETAILED DESCRIPTION

Figure 1:
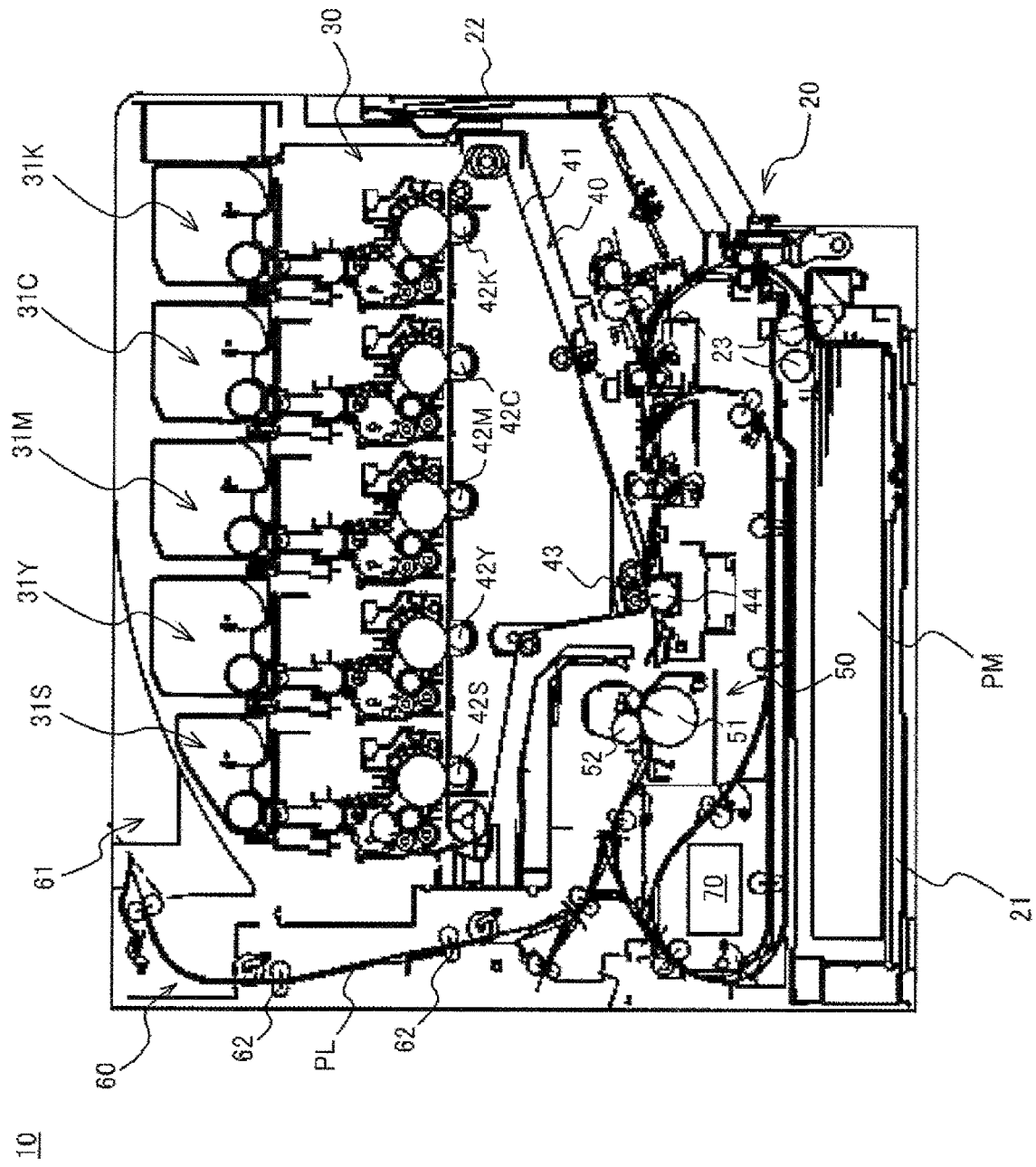
FIG. 1 is a diagram illustrating a schematic view of a configuration example of an image formation apparatus according to an embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only. The description is given in the following order:

1. An image formation apparatus
2. A machine learning device
3. A machine learning method
4. Modifications of the machine learning device and the machine learning method
5. A data processing system and a data processing method
6. Modifications of the data processing system and the data processing method In the following, a scope necessary for the explanation for achieving an object of the invention may be schematically explained, and elements necessary for the explanation of relevant parts of the invention may be mainly described, and elements omitted from the description may be based on known technologies. First, a basic configuration of an electrophotographic image formation apparatus for print output, as a machine learning device and a learning target of a machine learning method according to an embodiment, is briefly described below.

<1. Image Formation Apparatus>

FIG. 1 is a diagram illustrating a schematic configurational view of an image formation apparatus according to an embodiment. An image formation apparatus 10 illustrated herein is a so-called intermediate transfer type full-color LED (Light Emitting Diode) printer. As illustrated in FIG. 1, the image formation apparatus 10 is provided with a print medium supply unit 20 (or a print medium feeder), an image formation section 30 (or an image formation device), a transfer unit 40 (or a transfer device), a fixation unit 50 (or a fixation device), an discharge unit 60, and a control unit 70.

The print medium supply unit 20 is configured to supply print media PM into the image formation apparatus 10 and has a paper tray 21, a manual feed tray 22, and a plurality of paper feed rollers 23. The paper tray 21 is configured to accommodate therein a plurality of print media PM stacked therein. The print media PM to be housed in the paper tray 21 is generally general paper (A4 plain paper, B4 plain paper, etc.). The manual feed tray 22 is retractable into a side of the main body of the image formation apparatus 10, and is a tray for feeding special print media PM, which are different from the general paper, mainly when printing on the special print media PM. Therefore, this manual feed tray 22 is mainly used for industrial printing. A plurality of paper feed rollers 23 are located in appropriate places for conveying the print media PM in the paper tray 21 or placed on the manual feed tray 22 to the conveyance path PL. A rotational speed of each of the paper feed rollers 23 is controlled by the control unit 70, as described below.

The image formation section 30 is configured to form a toner image(s) and has a plurality of image formation units 31 (five image formation units 31C, 31M, 31Y, 31K, 31S in this embodiment) arranged in parallel. These plural image formation units 31C, 31M, 31Y, 31K, and 31S are basically the same in their configuration, only the toner color is different, and are mainly equipped with a photosensitive drum, a charging roller, a developing roller, an LED head, and a toner tank. A rotational speed of the photosensitive drum is controlled by the control unit 70, as described below. For the image forming process with each of these configurations, the same process as the well-known one can be employed, and therefore a detailed description thereof is omitted in this disclosure.

The image formation units 31C, 31M, 31Y, 31K, and 31S form toner images of cyan, magenta, yellow, black (corresponding to the so-called key plate), and a special color, respectively. By employing these plural image formation units 31, full color printing is possible. The toner image formed by each image formation unit 31 is transferred to an intermediate transfer belt 41 of the transfer unit 40, which will be described below. For example, a white toner, a clear toner, or a fluorescent toner (such as neon yellow or the like) can be employed as the above special color toner.

The transfer unit 40 is configured to transfer a toner image(s) formed in the image formation section 30 to a print medium PM. The transfer unit 40 is provided with the intermediate transfer belt 41, primary transfer rollers 42 (primary transfer rollers 42C, 42M, 42Y, 42K, and 42S), a backup roller 43, and a secondary transfer roller 44. The intermediate transfer belt 41 is an endless elastic belt supported by a plurality of rollers including a drive roller(s), and mainly composed of a resin material such as rubber. On the surface of the intermediate transfer belt 41, the toner images of respective colors formed by the image formation units 31 are transferred (primarily transferred) to form a toner image, and the formed toner image is then transferred (secondarily transferred) to the print medium PM. The primary transfer rollers 42C, 42M, 42Y, 42K, and 42S are provided to transfer the toner images of respective colors formed by the image formation units 31 to the intermediate transfer belt 41. The primary transfer rollers 42C, 42M, 42Y, 42K, and 42S are disposed opposite to the photosensitive drums of the image formation units 31C, 31M, 31Y, 31K, and 31S, respectively, in such a manner that the intermediate transfer belt 41 is sandwiched between the primary transfer rollers 42C, 42M, 42Y, 42K, and 42S and the opposed photosensitive drums. A predetermined primary transfer voltage is applied to the primary transfer rollers 42. The primary transfer voltage is controlled by the control unit 70 which is described later. Rotational speeds of the various rollers are also controlled by the control unit 70.

The backup roller 43 is one of a plurality of rollers supporting the intermediate transfer belt 41 and is positioned opposite to the secondary transfer roller 44, which will be described below, through the intermediate transfer belt 41 in between. The secondary transfer roller 44 is disposed in a middle of the conveyance path PL and opposed to the backup roller 43 with the intermediate transfer belt 41 between the secondary transfer roller 44 and the intermediate transfer belt 41. The secondary transfer roller 44 functions, when the print medium PM is passed between the secondary transfer roller 44 and the intermediate transfer belt 41, to transfer the toner image formed on the intermediate transfer belt 41 to the print medium PM. A predetermined secondary transfer voltage is applied to the secondary transfer roller 44. The secondary transfer voltage is controlled by the control unit 70 as described below.

The fixation unit 50 is configured to fix the toner image on the print medium PM by applying heat and pressure to the print medium PM to which the toner image is transferred by the transfer unit 40. The fixation unit is provided with a fixation roller 51 and a pressure roller 52. The fixation roller 51 has a heater (not illustrated) built in its interior, and the toner fixing temperature is controlled by the current value of the current supplied to the heater. The current value of the current supplied to the heater is controlled by the control unit 70, as described below. The pressure roller 52 applies a bias force to the fixation roller 51. This causes a predetermined fixing pressure to be applied to the print medium PM passing between the fixation roller 51 and the pressure roller 52. Rotational speeds of the various rollers are also controlled by the control unit 70. In this embodiment, the pressure roller 52 is pressurized against the fixation roller 51. However, in an embodiment, a configuration in which a fixed backup roller is adopted instead of the pressure roller 52 and the fixation roller 51 is pressurized against the backup roller may be adopted.

The discharge unit 60 discharges the print medium PM, on which the toner image is fixed by the fixation unit 50, to the outside of the image formation apparatus 10 as an actual printout AP (an actual printed matter AP), and is provided with an output tray 61 and a plurality of conveyance rollers 62. The output tray 61 is formed at an upper part of the image formation apparatus 10 and the actual printout AP output through the conveyance path PL are placed on the output tray 61. The plural conveyance rollers 62 are provided at locations in the conveyance path PL to convey the print medium PM to the output tray 61. The rotational speed of the plural conveyance rollers 62 is controlled by the control unit 70, as described below. A cooling device configured to remove the heat generated when the toner image is fixed may be optionally provided at any position of the discharge unit 60. The cooling device can be configured, for example, by employing rollers having a heat dissipation function in at least a part of the conveyance rollers 62, or by disposing a heat pipe, heat sink, fan, or the like known as a cooling device at a predetermined position of the discharge unit 60.

The control unit 70 is configured to control each part of the image formation apparatus 10 and includes a well-known CPU (Central Processing Unit), memories, and the like. The control unit 70 controls the printing speed in the image formation apparatus 10 by, for example, controlling the rotation speed of the various rollers in the image formation apparatus 10. The control unit 70 controls, for example, the secondary transfer voltage applied to the secondary transfer roller 44. The control unit 70 controls the toner fixing temperature, for example, by controlling the current value of the current supplied to the heater inside the fixation roller 51.

In this example, the image formation apparatus 10 is configured using the full color LED printer of the intermediate transfer type, but the image formation apparatus 10 is not limited to this. For example, a tandem type or a rotary type of a printer that transfers directly from a photosensitive drum to a print medium may be employed instead of the intermediate transfer type. A monochrome type may be employed instead of the full color type. Instead of the full color type with the special color toner, a full color type without a special color toner may be employed. Instead of the LED head, a laser head may be employed. Instead of the printer, a copier or a fax machine may be employed as the image formation apparatus. Instead of the printer, a digital multifunctional device that combines functions of a printer, copier, and fax machine may be employed as the image formation apparatus.

When performing industrial printing using the image formation apparatus 10 with the above-described configuration, it may be difficult to adequately adjust control information by the conventional technology, as indicated above. As a result, a rate of poor quality printing (print defects) may become high in the industrial printing. When such print defects occur, a specialized engineer comprehensively considers the condition of the actual printout (the actual printed matter), the control information of the image formation apparatus at the time of printing, the past experience, and the accumulated know-how, so as to derive most appropriate control information to obtain the desired print result. However, this process may take a long time to complete and the cost may be very high because the specialized engineer is occupied every time a print defect occurs. Therefore, an object of an embodiment in this disclosure may be to automate adjustment of the control information of the image formation apparatus 10 by using a learned model generated by a machine learning device 100 and a machine learning method described below.

By the way, when the image formation apparatus 10 performs printing as described above, various pieces of control information are adjusted to obtain an optimal print result. After these various pieces of control information are examined, it is found that, among these various pieces of control information, the secondary transfer voltage applied to the secondary transfer roller 44 and the toner fixing temperature of the fixation roller 51 (i.e., the current value of the current supplied to the heater in the fixation roller 51) are two pieces of control information that may particularly affect the print quality. In other words, it is found that these secondary transfer voltage and toner fixing temperature are the control information that may have high correlations with the print defects appearing on the printed surface. Based on further examination of the relationship between these two pieces of the control information and the print defects, it is found that a high secondary transfer voltage is mainly responsible for dusting (a print defect where white spots appear), while a low secondary transfer voltage is mainly responsible for blurring (a print defect where the color becomes lighter). It is also found that a high toner fixing temperature is mainly responsible for speckles (a print defect where a speckled pattern is occurred), while a low toner fixing temperature is mainly responsible for poor fixation (a print defect where toner peeling is occurred) and so-called picture misalignment (a print defect where thin density area is occurred).

Figure 2A:
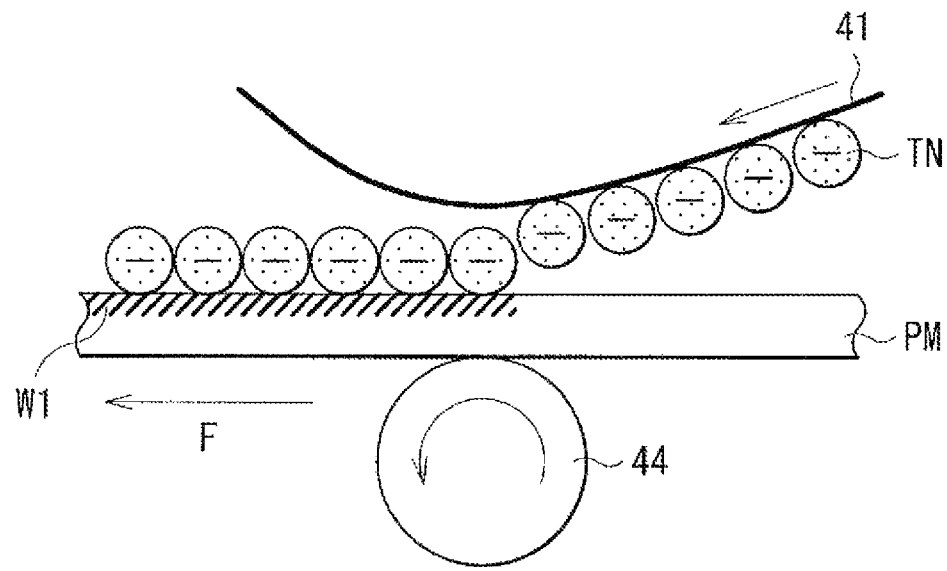
FIG. 2A is a diagram illustrating a view of an example of a state of a toner on a print media in the vicinity of a secondary transfer roller of a transfer unit.
Figure 2B:
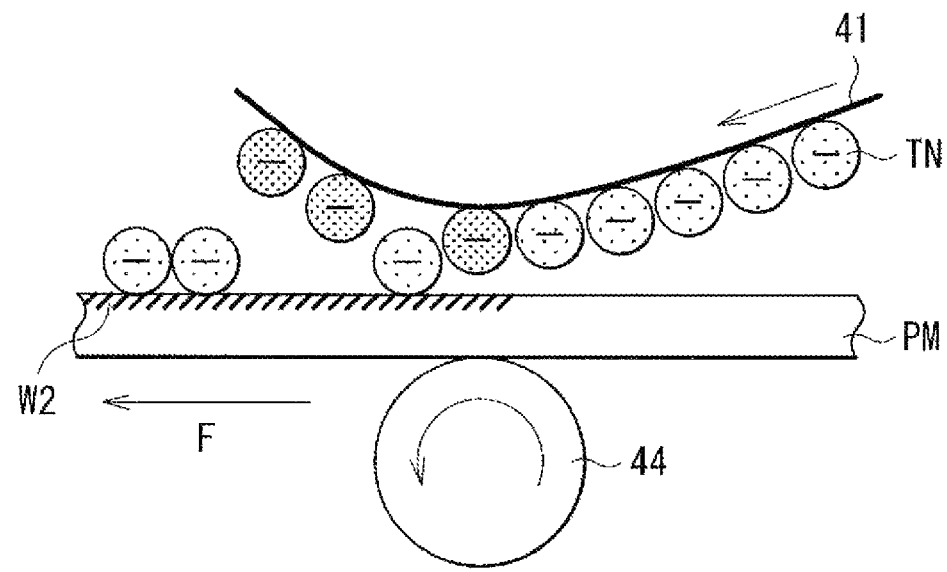
FIG. 2B is a diagram illustrating a view of another example of a state of the toner on the print medium in the vicinity of the secondary transfer roller of the transfer unit.

FIGS. 2A and 2B each illustrates a state of a toner TN on the print medium PM in the vicinity of the secondary transfer roller 44 of the transfer unit 40, wherein FIG. 2A illustrates a case where the secondary transfer voltage is appropriate and FIG. 2B illustrates a case where the secondary transfer voltage is low. In FIGS. 2A and 2B, the print medium PM is conveyed in the left direction (the conveyance direction F). The intermediate transfer belt 41 is circulated in a clockwise direction in FIG. 1. The toner adsorbed on the intermediate transfer belt 41 is negatively charged. To the contrary, the print medium PM is positively charged by the voltage supplied by the secondary transfer roller 44.

When the secondary transfer voltage is appropriate, as illustrated in FIG. 2A, the print medium PM is sufficiently positively charged (part W1 in FIG. 2A) so that the toner TN on the intermediate transfer belt 41 is induced to the print medium PM by the electrostatic power. In this way, the toner TN is transferred to the print medium PM.

On the other hand, when the secondary transfer voltage is low, as illustrated in FIG. 2B, the print medium PM may not be sufficiently positively charged (part W2 in FIG. 2B). In this case, some of the toner TN on the intermediate transfer belt 41 remains on the intermediate transfer belt 41 without being induced to the print medium PM due to the electrostatic force. This results in an image portion parts of which have no toner TN on the print medium PM, for example, which may cause blurring.

Figure 3A:
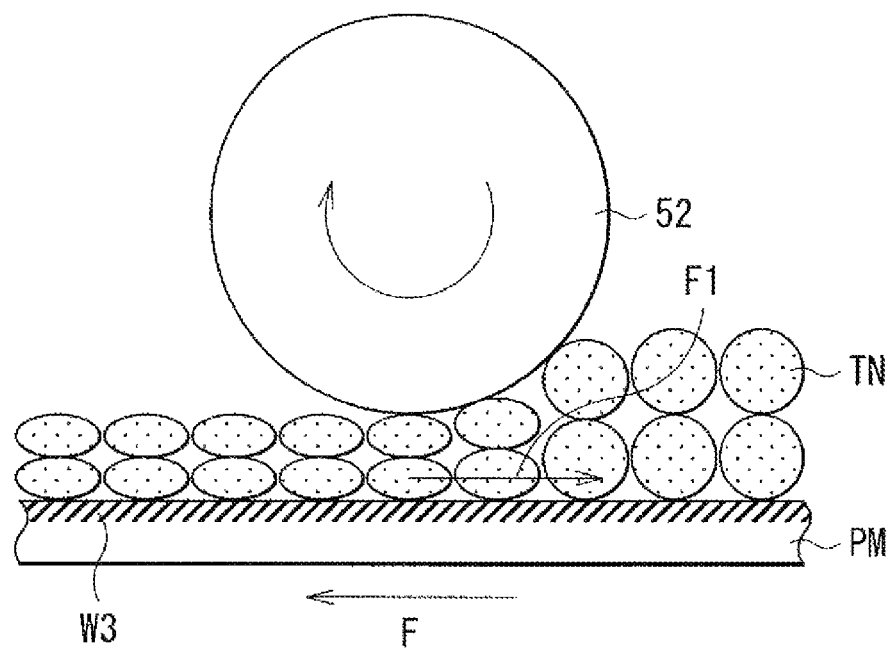
FIG. 3A is a diagram for explaining an example of a state of the toner on the print medium near in the vicinity of the fixation unit.
Figure 3B:
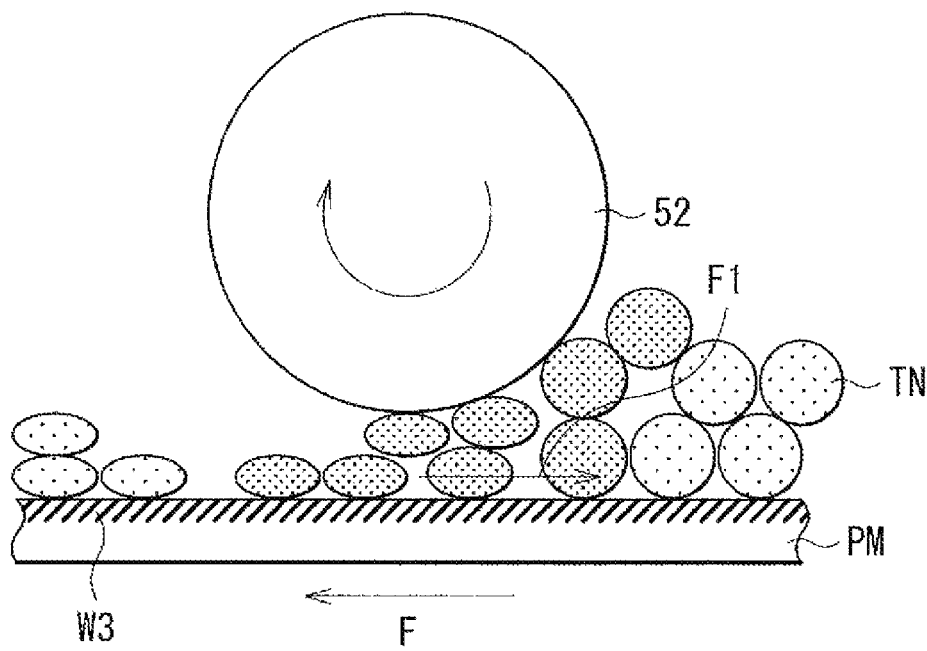
FIG. 3B is a diagram for explaining another example of a state of the toner on the printing medium in the vicinity of the fixation unit.

FIGS. 3A and 3B each illustrates a state of a toner TN on the print medium PM in the vicinity of the fixation unit 50, wherein FIG. 3A illustrates a case where the toner fixing temperature is appropriate and FIG. 3B illustrates a case where the toner fixing temperature is low. In FIGS. 3A and 3B, the print medium PM is conveyed in the left direction (the conveyance direction F). Since the pressure roller 52 is biased against the fixation roller 51 (not illustrated), a predetermined fixing pressure is applied to the print medium PM.

When the toner fixing temperature is appropriate, as illustrated in FIG. 3A, the toner TN on the print medium PM is subjected to a pressure F1 in the direction opposite to the conveyance direction F of the print medium PM by the fixing pressure in the gap between the pressure roller 52 and the print medium PM. However, due to various resistances, such as friction on the surface of the print medium PM (part W3 in FIG. 3A), the toner TN remains unmoved from the transferred position on the print medium PM and is melted and fixed in that position by the heat supplied from the fixation roller 51. With this, the toner TN is fixed at the transferred position on the print medium PM.

On the other hand, when the toner fixing temperature is low, as illustrated in FIG. 3B, the melting of the toner TN is delayed because the heat supplied from the fixation roller 51 is insufficient. As a result, the toner TN is clogged in the gap between the pressure roller 52 and the print medium PM, shifted in the direction F1 from the transferred position on the print medium PM, and is melted and fixed at this shifted position. As a result, an image portion with a low density, for example, is produced on the print medium PM. This is how the so-called picture misalignment occurs.

In this way, in the image formation apparatus 10, the secondary transfer voltage and the toner fixing temperature affect the print quality. Therefore, the machine learning device 100 according to an embodiment generates learned models by learning the secondary transfer voltage and the toner fixing temperature among the various pieces of control information. As a result, it is expected that the secondary transfer voltage and the toner fixing temperature can be adjusted by the learned models, to improve the print quality.

In the image formation apparatus 10, the printing speed also affects the print quality. For example, if the printing is performed at a slow printing speed using thin print media PM, the print media PM may curl and thus clog in the image formation apparatus. In addition, if the printing is performed at a high printing speed using thick print media PM, the toner may not be melted sufficiently and thus a print defect may occur. Thus, for example, when printing using the thin print media PM, it is preferable that the printing speed is faster, and when printing using the thick print media PM, it is preferable that the printing speed is slower.

The image formation apparatus 10 is configured to be capable of printing at two printing speeds SPA and SPB. The printing speed SPA is a fast speed, faster than the printing speed SPB and the printing speed SPB is a slow speed, slower than the printing speed SPA. For example, the printing speed SPA is set to about twice the printing speed SPB. The printing speed can be defined as the number of printable sheets per unit of time. If the unit time is one minute, the unit of the printing speed is, for example, page per minute (PPM). For example, the printing speed SPA may be set to 40 PPM and the printing speed SPB may be set to 16 PPM. The image formation apparatus 10 prints at the printing speed SPA when printing on thin print media PM, and prints at the printing speed SPB when printing on thick print media PM, for example. When the image formation apparatus 10 performs printing on medium-thickness print media PM, the image formation apparatus 10 prints at one of the printing speed SPA and the printing speed SPB, of which the print quality can be higher. In this example, the two printing speeds SPA and SPB are provided, but are not limited to this example, and three or more printing speeds may be provided.

The machine learning device 100 according to an embodiment generates a learned model for each of the two printing speeds SPA and SPB. As a result, as will be described later, it is expected that the amount of data required for the learning process can be reduced, and learned models that are capable of generating highly accurate control information can be generated to improve the print quality.

Thus, the machine learning device 100 generates the learned model for adjusting the secondary transfer voltage and the toner fixing temperature for each of the two printing speeds SPA and SPB, so as to adjust the secondary transfer voltage and the toner fixing temperature by using the generated learned models. In the following, a specific configuration and a series of machine learning processes for generating the learned models are explained.

<2. Machine Learning Device>

Figure 4:
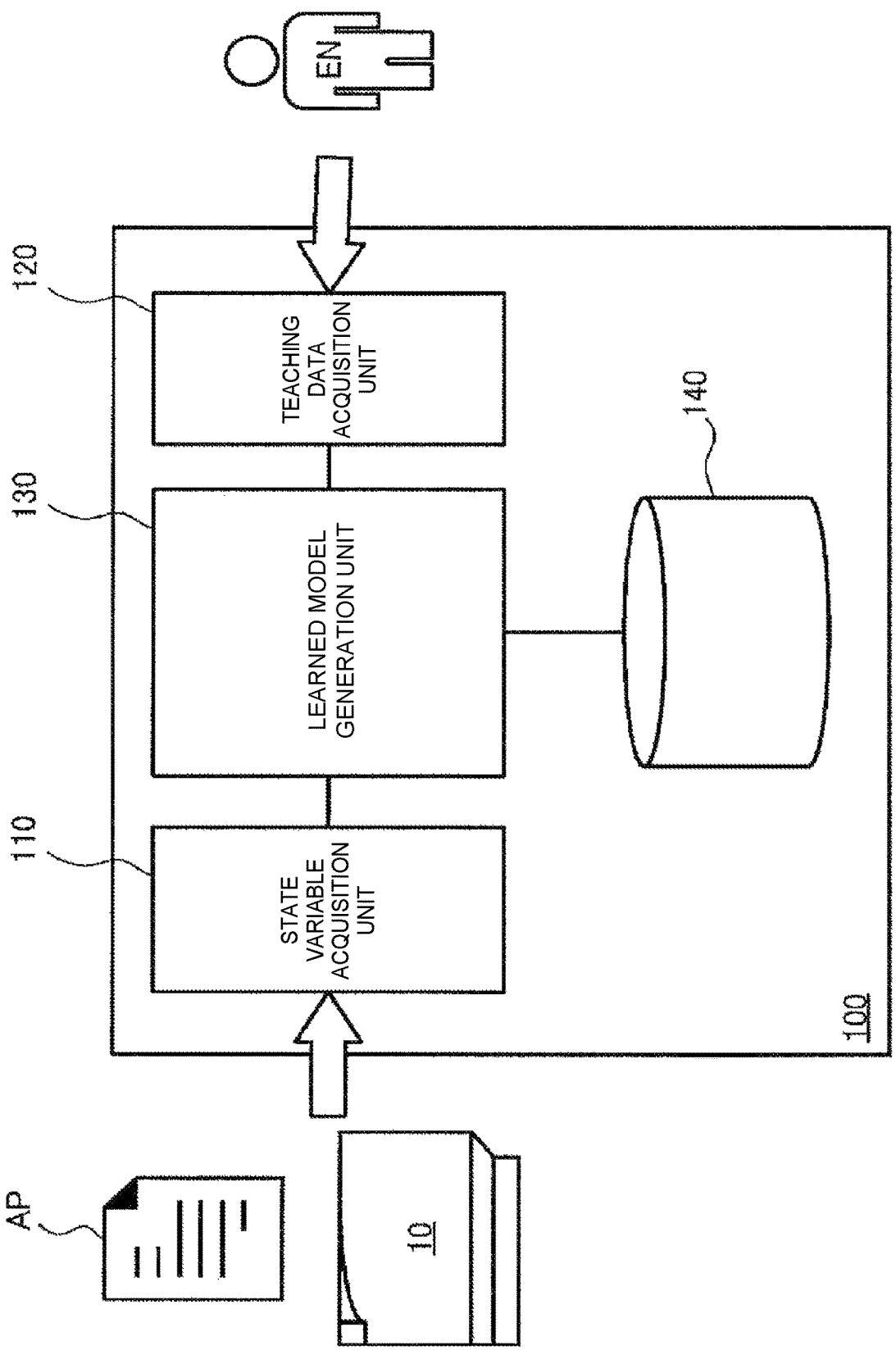
FIG. 4 is a block diagram illustrating a schematic view of a configuration example of a machine learning device in an embodiment.

FIG. 4 is a schematic block diagram of the machine learning device 100 according to an embodiment. The machine learning device 100 has a state variable acquisition unit 110, a teaching data acquisition unit 120, a learned model generation unit 130, and a storage unit 140. As can be understood from the components described above, the machine learning device 100 according to an embodiment is a device configured to generate learned models by so-called supervised learning. In FIG. 4, for the purpose of facilitating understanding, the machine learning device 100 is illustrated as an example of the machine learning device 100 embedded in a computer (such as a server device, a personal computer (PC), or the like) that is separate from the image formation apparatus 10. However, the machine learning device 100 may be embedded in the image formation apparatus 10. The machine learning device 100 may include at least a processor such as a CPU and a memory such as a RAM (Random Access Memory) and a ROM (Read Only Memory) to realize functions of the components therein.

The state variable acquisition unit 110 acquires parameter information, as state variables, necessary to generate learned models. In performing machine learning, the state variables may be the most important determinant of the accuracy of the learned models to be generated. It should also be noted that a combination of information obtained as state variables may be a very important factor, because a combination of different state variables will naturally result in a different learned model.

In an embodiment, the state variable acquisition unit 110 acquires a dataset 400 of the state variables including three information that include: feature value information 401 of an actual printout AP (an actual printed matter AP); medium information 402, which is information of the print medium PM (see FIG. 1) used to output the actual printout AP; and control information of the image formation apparatus 10 when the image formation apparatus 10 outputs the actual printout AP (hereinafter may be referred to as "first control information 403"). The method of acquiring the information of the state variables can be arbitrarily set up according to the connection configuration between the machine learning device 100 and the image formation apparatus 10, or the like. For example, the information of the state variables may be acquired by using a local communication method, a communication method via the Internet, or other methods, or through any storage medium. The acquired feature value information 401, medium information 402, and first control information 403 are then stored as one dataset 400 in the storage unit 140. Specifically, the dataset 400 that contains a print result at the printing speed SPA is stored in the storage unit 140 as a dataset 400A corresponding to the printing speed SPA, and the dataset 400 that contains a print result at the printing speed SPB is stored in the storage unit 140 as a dataset 400B corresponding to the printing speed SPB.

The feature value information 401 of the actual printout AP includes information about print defects (poor quality printing) occurred in the actual printout AP. The information about the print defects is information about the degrees of the print defects. The feature value information 401 that is actually input to the machine learning device 100 can be, for example, information of image data of the actual printout AP read by a scanner, which may have a well-known configuration, and it is not necessary to specify in advance specific types and degrees of the print defects in the actual printout AP or the like. This is because the learning method of the machine learning device learns the control information that can obtain suitable print results, regardless of the types or degrees of the print defects, and thus is not necessary to determine the types or degrees of the print defects. Nevertheless, it is, of course, possible to employ a preprocessing process in which, for example, the information of the above-described image data is pre-adjusted to information suitable to be input to the input layer of the machine learning device (e.g., information such as the types and degrees of print defects). An explanation of a specific preprocessing process is omitted here because it is easily understood by those skilled in the art that methods normally used in the art of image recognition can be employed.

The medium information 402 of the print medium PM is various information about the print medium PM, and preferably information about the presence or absence of a coating, materials, thickness, weight, and density of the print medium PM. The above five types of information have been identified by the inventor and others as parameters that particularly affect the print quality. The machine learning based on these five types of information can efficiently generate a highly accurate learned model. For the information about the material of the print medium PM, it is sufficient to identify a main material used in the print medium PM and not necessarily to include information about additional materials. For the information about the weight of the print medium PM, various types of information about the weight can be used as long as they indicate characteristics related to the weight of the print medium PM. For example, those generally used in the technical field of the image formation apparatus, such as basis weight and continuous weight, can be used as the information about the weight of the print medium PM.

The first control information 403 is the control information that was actually set in the image formation apparatus 10 when the image formation apparatus 10 outputted the actual printout AP. The first control information 403 preferably includes the control information about the toner fixing temperature of the fixation roller 51 in the image formation apparatus 10 and about the secondary transfer voltage applied to the secondary transfer roller 44. Note that the value of the secondary transfer voltage is included in the first control information 403 in this example, because the toner image is transferred from the intermediate transfer belt 41 to the print medium PM in the image formation apparatus 10 described above. To the contrary, in a case of a tandem-type image formation apparatus that does not have an intermediate transfer belt and transfers the toner image directly from the photosensitive drum to the print medium, a transfer voltage for transferring the toner image from the photosensitive drum of each of the image formation units of respective colors to the print medium PM may be included in the first control information 403.

The teaching data acquisition unit 120 acquires teaching data 410 including control information that is improved to sufficiently reduce the print defects on the actual printout AP (hereinafter referred to as second control information 411) and a value indicating degrees of print defects (hereinafter referred to as a print defect value 412).

The second control information 411 is control information to make the feature value information 401 of the actual printout AP less than or equal to a predetermined threshold value TH. The second control information 411 includes the control information about the toner fixing temperature of the fixation roller 51 and the secondary transfer voltage applied to the secondary transfer roller 44 in the image formation apparatus 10. The second control information 411 is control information that is derived, for example, by an engineer EN, based on the output result on the actual printout AP and the control information of the image format ion apparatus that was used to output the actual printout AP, or the like. Therefore, the above-described "predetermined threshold TH" does not necessarily have to refer to a specific value. That is, if the control information is such control information that an appropriate output result can be obtained from the viewpoint of the engineer EN or the like, the control information can be said to be control information that makes "the feature value information 401 less than or equal to the predetermined threshold TH".

The print defect value 412 is a value indicating degrees of print defects on the actual printout AP when the image formation apparatus 10 performs printing using the second control information 411. In this example, the print defect value 412 indicates that the smaller the print defect value, the less the print defects, while the larger the print defect value, the more the print defects. This print defect value 412 may be a numerical value of the degrees of the print defects of the actual printout AP as visually confirmed by the engineer EN, or it may be a value calculated based on the scanned image of the actual printout AP by a well-known method. For example, the fact that the feature value information 401 is equal to or less than the predetermined threshold TH may correspond to the fact that the print defect value 412 is equal to or less than a predetermined threshold TH2. For example, in a case where the predetermined threshold TH2 is set to "2", it can be said that the print defects are sufficiently reduced when the print defect value 412 is "2" or less. For example, both when the print defect value 412 is "1" and when the print defect value 412 is "2", there are sufficiently less print defects, and the print quality is better when the print defect value 412 is "1" than when the print defect value 412 is "2". It is preferable that the second control information 411 is such control information that the print defect value 412 is as small as possible.

The second control information 411 and the print defect value 412 may be obtained by the engineer EN directly inputting the data into the teaching data acquisition unit 120, or by using various communication means, or through any storage medium. The second control information 411 and the print defect value 412 obtained are then stored in the storage unit 140 as one teaching data 410 associated with the corresponding dataset 400. Specifically, the teaching data 410 corresponding to the printing speed SPA is stored in the storage unit 140 in association with the dataset 400A as teaching data 410A for the printing speed SPA, whereas the teaching data 410 corresponding to the printing speed SPB is stored in the storage unit 140 in association with the dataset 400B as teaching data 410B for the printing speed SPB.

The learned model generation unit 130 generates a learned model 421 by performing machine learning based on the dataset 400 obtained by the state variable acquisition unit 110 and the teaching data 410 obtained by the teaching data acquisition unit 120. Specifically, the learned model generation unit 130 generates a learned model 421A by performing machine learning based on the dataset 400A and the teaching data 410A, and generates a learned model 421B by performing machine learning based on the dataset 400B and the teaching data 410B.

The machine learning device 100 thus generates the two learned models 421A and 421B corresponding to the two printing speeds SPA and SPB, respectively. This allows the machine learning device 100 to reduce an amount of data required for the learning process and to generate the learned models 421A and 421B that can generate highly accurate control information, as described below.

FIG. 5 illustrates data required for the learning process in a case of generating a single learned model 421 common to the two printing speeds SPA and SPB, and data required for the learning process in a case of generating the two learned models 421A and 421B corresponding to the two printing speeds SPA and SPB, respectively. When the image formation apparatus 10 performs printing, for example, using thin print media PM, the image formation apparatus 10 performs printing at the printing speed SPA. When the image formation apparatus 10 performs printing, for example, using thick print media PM, the image formation apparatus 10 performs printing at the printing speed SPB. When the image formation apparatus 10 performs printing, for example, using medium-thickness print media PM, the image formation apparatus 10 performs printing at one of the printing speed SPA and the printing speed SPB, of which the print quality can be higher.

For example, in the case of generating the single learned model 421 that is common to the two printing speeds SPA and SPB, it is necessary that the single learned model 421 is made to be used for both the two printing speeds SPA and SPB. Therefore, in this case, the datasets 400 and the teaching data 410 at the two printing speeds SPA and SPB for all the thin print media PM, the thick print media PM, and the medium-thickness print media PM are required in the learning process. In the case where the single learned model 421 is generated by using all of these pieces of data, the single learned model 421 can be used under various conditions, but the print quality may not be sufficiently high under each condition.

On the other hand, in the case where two learned models 421A and 421B respectively corresponding to the two printing speeds SPA and SPB are generated, the amount of data required for the learning process can be reduced. In other words, as illustrated in FIG. 5, when the learned model 421A is generated, the dataset 400 and the teaching data 410 at the printing speed SPA for each of the thin print media PM and the medium-thickness print media PM are required in the learning process. In addition, when the learned model 421B is generated, the dataset 400 and the teaching data 410 at the printing speed SPB for each of the thick print media PM and the medium-thickness print media PM are required in the learning process. Therefore, the amount of data required for the learning process can be reduced. In this case, the learned model 421A is suitable for the printing speed SPA and the learned model 421B is suitable for the printing speed SPB, so that the print quality can be sufficiently improved in each condition.

In this example, the data processing system performs printing at one of the printing speed SPA and the printing speed SPB that can realize a higher print quality than the other, when printing using the medium-thickness print media PM, as described below. Specifically, the data processing system compares the print defect value calculated using the learned model 421A with the print defect value calculated using the learned model 421B, and selects the printing speed corresponding to one of the learned models 421A and 421B that has the lower print defect value, as described below. This allows the data processing system to improve the print quality. In other words, if a category of the medium-thickness of the print medium PM is not provided, the print quality on such medium-thickness print media may be degraded because one of the printing speed SPA and the printing speed SPB is uniquely selected depending on the thickness of the print media PM. To the contrary, an embodiment of the disclosure defines the classification of the medium-thickness that can be printed at both of the two printing speeds SPA and SPB. Therefore, the print quality on such the medium-thickness print media PM can be considered at each of the two printing speeds SPA and SPB, and thus the print quality can be improved.

This defined range of the medium-thickness of the print media PM is empirically established based on printing experiments. Also this defined range of the medium-thickness of the print media PM may vary depending on the presence or absence of coating on the print media PM.

Next, a specific method of machine learning in the learned model generation unit 130 is described in detail below. The machine learning device 100 employs supervised learning using a neural network model 900 as a learning method thereof.

Figure 6:
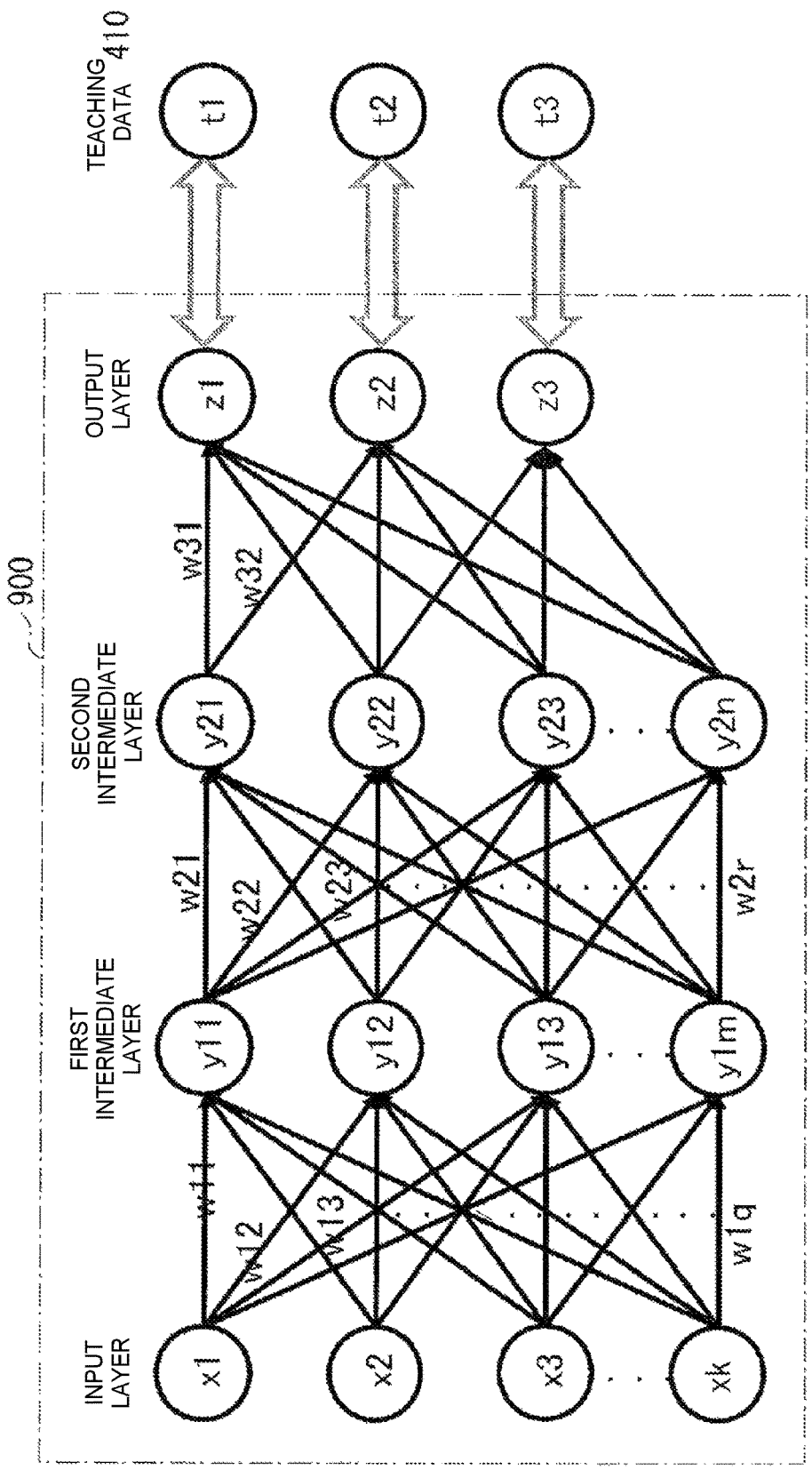
FIG. 6 is a diagram illustrating a view of an example of a neural network model for supervised learning implemented by the machine learning device such as being illustrated in FIG. 4.

FIG. 6 illustrates a view of an example of the neural network model 900 for the supervised learning implemented in the machine learning device according to an embodiment. A neural network in the neural network model 900 illustrated in FIG. 6 includes k neurons ($x1, x2, x3, \ldots,$ and $xk$) in an input layer, m neurons ($y11, y12, y13, \ldots,$ and $y1m$) in a first intermediate layer, n neurons ($y21, y22, y23, \ldots,$ and $y2n$) in a second intermediate layer, and three neurons ($z1, z2,$ and $z3$) in an output layer. The first and second intermediate layers may be referred to as hidden layers. The neural network may have a plurality of additional hidden layers in addition to the first and second intermediate layers, or the neural network may have only the first intermediate layer as a hidden layer without the second intermediate layer.

Nodes connecting the neurons between the input layer and the first intermediate layer, between the first intermediate layer and the second intermediate layer, and between the second intermediate layer and the output layer are provided, and each node is associated with a weight wi (i is a natural number).

Next, an example of processes of generating the learned model 421A by performing the machine learning based on the dataset 400A and the teaching data 410A corresponding to the printing speed SPA is described below.

In the neural network in the neural network model 900 according to an embodiment, the learned model generation unit 130 learns, by using the dataset 400A, the correlation between the control information of the image formation apparatus 10 and the actual printout (the actual printed matter) output by the image formation apparatus 10. Specifically, the learned model generation unit 130 calculates the value of each neuron in the output layer by mapping the dataset 400A to the plurality of neurons in the input layer. First, the learned model generation unit 130 calculates the values of the m neurons ($y11, y12, y13, \ldots,$ and $y1m$) in the first intermediate layer based on the values of the k neurons ($x1, x2, x3, \ldots,$ and $xk$) in the input layer. Specifically, the learned model generation unit 130 calculates the value of each neuron in the first intermediate layer by performing weighted addition based on the values of the k neurons in the input layer, connected to said neurons in the first intermediate layer, using the weights Wi associated with each node. Similarly, the learned model generation unit 130 calculates the values of the n neurons ($y21, y22, y23, \ldots,$ and $y2n$) in the second intermediate layer based on the values of the m neurons in the first intermediate layer, and calculates the values of the three neurons ($z1, z2,$ and $z3$) in the output layer based on the values of the n neurons in the second intermediate layer. In this way, the learned model generation unit 130 can calculate the value of each neuron in the output layer by mapping the dataset 400A to the plurality of neurons in the input layer. Note that regarding mapping the dataset 400A to the k neurons of the input layer, a format to map the information contained in the dataset 400A to the k neurons of the input layer can be appropriately set in view of the accuracy of the learned model generated. For example, in a case where the feature value information 401 includes the image data of the actual printout AP, the image data can be divided into predetermined regions, and the color value (e.g., RGB value) information of the divided regions can be associated with the plurality of neurons in the input layer, respectively.

Then, the learned model generation unit 130 compares the calculated values of the three neurons $z1$ to $z3$ in the output layer and the values of the three data $t1$ to $t3$ in the teaching data 410A, respectively, to obtain errors (error values). Here, the values of the neurons $z1$ to $z3$ are a toner fixing temperature, a secondary transfer voltage, and a print defect value in this embodiment. The values of the data $t1$ to $t3$ are a toner fixing temperature, a secondary transfer voltage, and a print defect value 412A that are contained in the teaching data 410A associated with the dataset 400A. Then, the learned model generation unit 130 repeats adjustment (back-provocation) of the weight Wi associated with each node so that the calculated errors are small.

When the series of the processes described above is repeated a predetermined number of times, or when the series of the processes described above is repeated until a predetermined condition is met such that the errors described above are smaller than acceptable values, the learned model generation unit 130 ends the learning, and then stores the neural network model 900 into the storage unit 140 as the learned model 421A. In this way, the learned model generation unit 130 generates the learned model 421A that includes the information about all of the weights Wi respectively corresponding to the nodes in the neural network model 900.

The processes of generating the learned model 421A by performing machine learning based on the dataset 400A and the teaching data 410A corresponding to the printing speed SPA has been described above. The same applies to the processes of generating the learned model 421B by performing machine learning based on the dataset 400B and the teaching data 410B corresponding to the printing speed SPB, and thus the detailed explanation thereof is omitted for avoiding redundancy.

The storage unit 140 is configured to store therein the datasets 400A and 400B obtained by the state variable acquisition unit 110, the teaching data 410A and 410B obtained by the teaching data acquisition unit 120, and the learned models 421A and 421B generated by the learned model generation unit 130.

Figure 7:
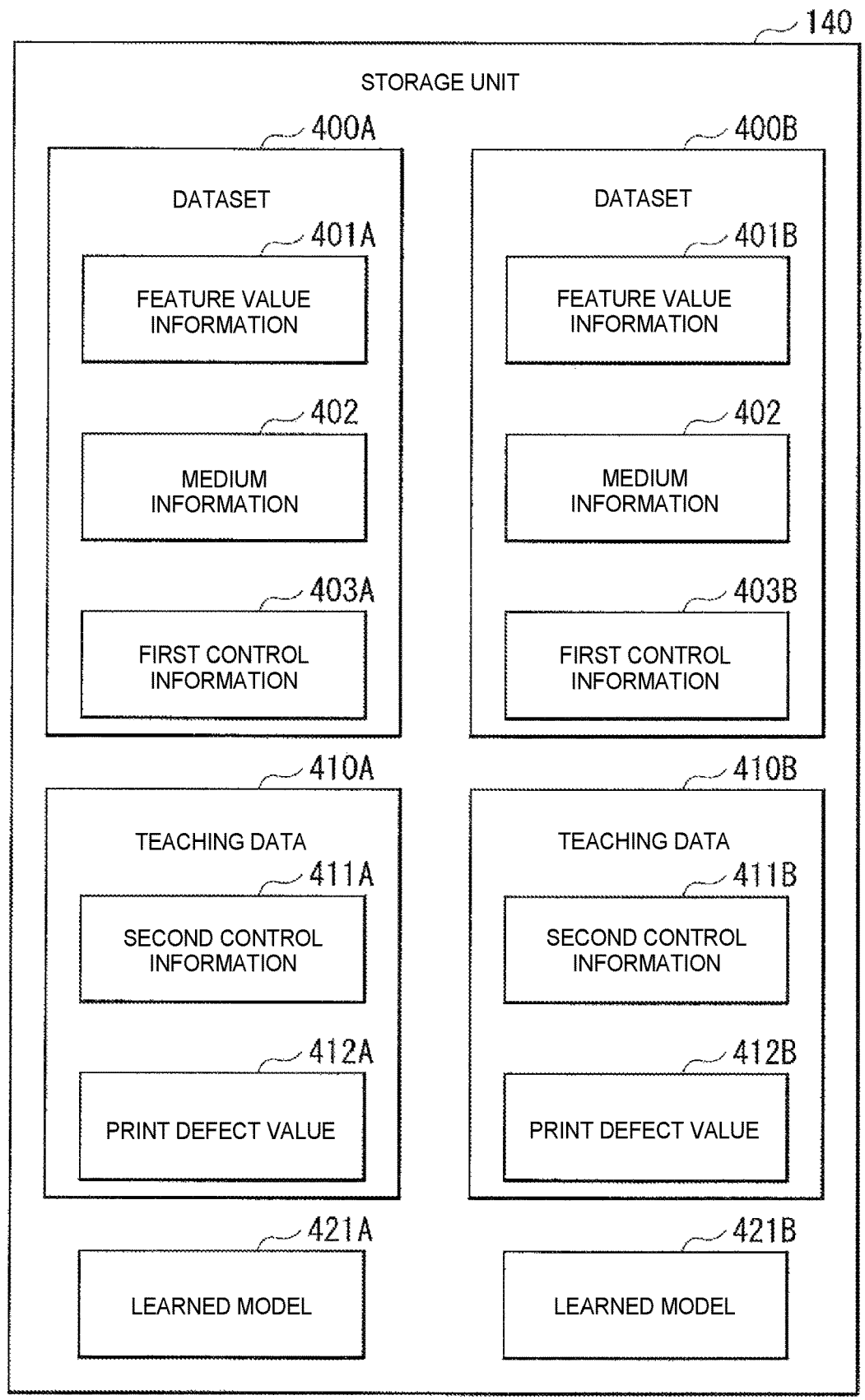
FIG. 7 is a diagram for explaining an example of data stored in a storage unit such as being illustrated in FIG. 4.

FIG. 7 illustrates an example of data stored in the storage unit 140. The storage unit 140 stores therein the datasets 400A and 400B, the teaching data 410A and 410B, and the learned models 421A and 421B.

The dataset 400A includes feature value information 401A, medium information 402, and first control information 403A. The dataset 400B includes feature value information 401B, medium information 402, and first control information 403B. The feature value information 401A includes information about print defects in an actual printout AP when the image formation apparatus 10 has printed using the first control information 403A at the printing speed SPA, and the first control information 403A is control information that was set in the image formation apparatus 10 in that printing. The feature value information 401B includes information about print defects in an actual printout AP when the image formation apparatus 10 has printed using the first control information 403B at the printing speed SPB, and the first control information 403B is control information that was set in the image formation apparatus 10 in that printing.

The teaching data 410A includes second control information 411A and a print defect value 412A. The teaching data 410B includes second control information 411B and a print defect value 412B. The second control information 411A is control information for the image formation apparatus 10 such that the feature value information 401A is less than or equal to the predetermined threshold value TH when the image formation apparatus 10 prints at the printing speed SPA. The print defect value 412A is a value that indicates the degrees of print defects when the image formation apparatus 10 prints at the printing speed SPA using the second control information 411A. The second control information 411B is control information for the image formation apparatus 10 such that the feature value information 401A is less than or equal to the predetermined threshold value TH when the image formation apparatus 10 prints at the printing speed SPB. The print defect value 412A is a value that indicates the degrees of print defects when the image formation apparatus 10 prints at the printing speed SPB using the second control information 411B.

The learned model 421A is the learned model 421 that is generated by the learned model generation unit 130 by performing machine learning based on the dataset 400A and the teaching data 410A. The learned model 421B is the learned model 421 that is generated by the learned model generation unit 130 by performing machine learning based on the dataset 400B and the teaching data 410B.

The learned models 421A and 421B stored in the storage unit 140 are applied, upon request, to a real system via the Internet or other communication means or a storage media. A specific application of the learned model to a real system (a data processing system) is described in detail later.

The state variable acquisition unit 110 corresponds to a specific example of a "state variable acquisition unit" in the disclosure. The teaching data acquisition unit 120 corresponds to a specific example of a "teaching data acquisition unit" in the disclosure. The learned model generation unit 130 corresponds to a specific example of a "learned model generation unit" in the disclosure. The printing speed SPA corresponds to a specific example of a "first printing speed" in the disclosure. The printing speed SPB corresponds to a specific example of a "second printing speed" in the disclosure. The dataset 400A corresponds to a specific example of a "first state variable dataset" in the disclosure. The dataset 400B corresponds to a specific example of a "second state variable dataset" in the disclosure. The feature value information 401 corresponds to a specific example of "feature value information" in the disclosure. The medium information 402 corresponds to a specific example of "medium information" in the disclosure. The first control information 403 corresponds to a specific example of "first control information" in the disclosure. The teaching data 410A corresponds to a specific example of "first teaching data" in the disclosure. The teaching data 410B corresponds to a specific example of "second teaching data" in the disclosure. The second control information 411 corresponds to a specific example of "second control information" in the disclosure. The print defect value 412 corresponds to a specific example of a "print defect value" in the disclosure. The learned model 421A corresponds to a specific example of a "first learned model" in the disclosure. The learned model 421B corresponds to a specific example of a "second learned model" in the disclosure.

<3. Machine Learning Method>

Figure 8:
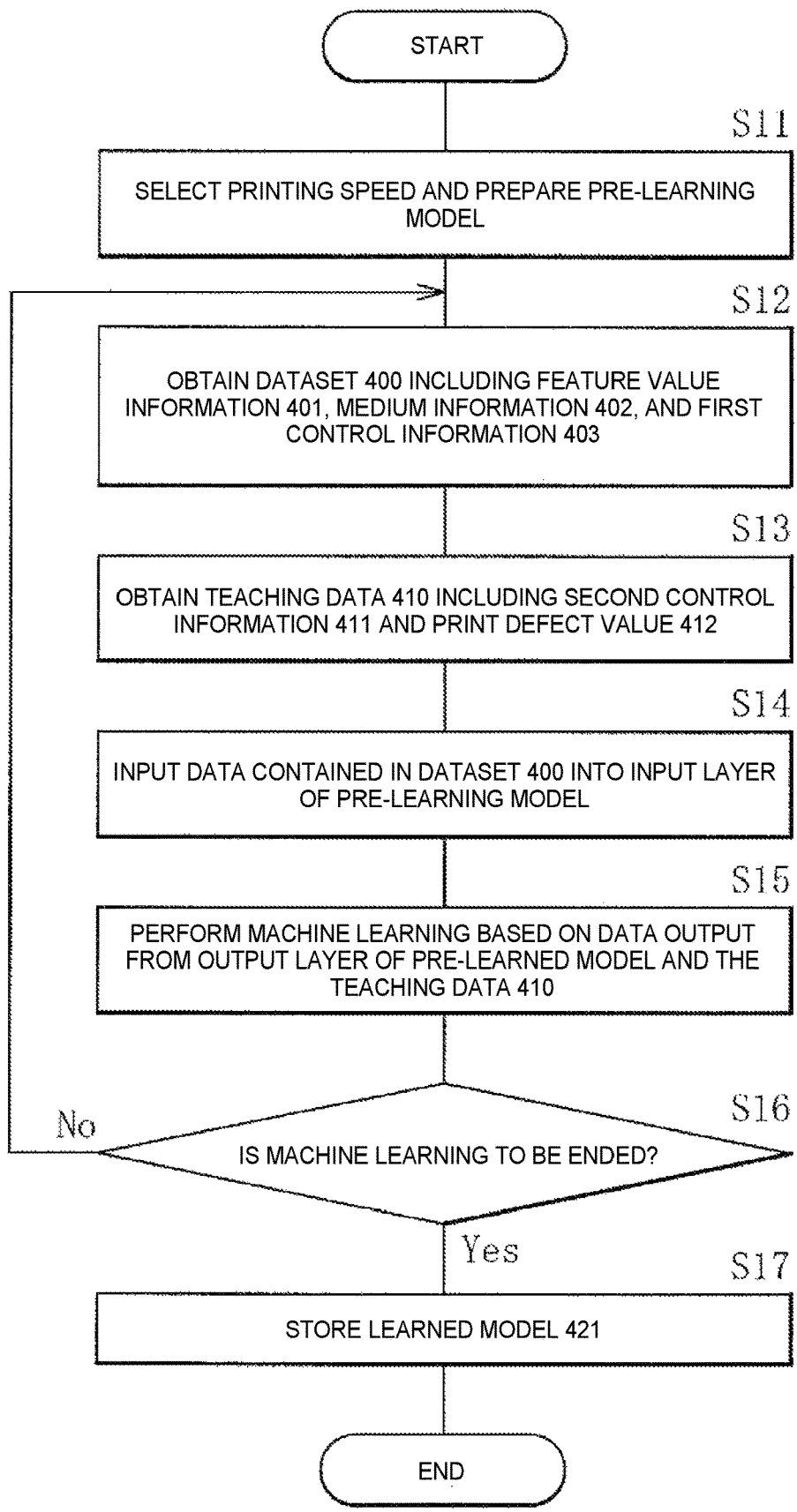
FIG. 8 is a flowchart illustrating an example of a machine learning method by the machine learning device such as being illustrated in FIG. 4.

In connection with the aforementioned machine learning device, the disclosure also describes a machine learning method. FIG. 8 is a flowchart illustrating a machine learning method according to an embodiment. This machine learning method is realized by using a computer, but various computers can be applied as the computer. Such a computer may be, for example, a computer composing the control unit 70 in the image formation apparatus 10, a PC locally connected to the image formation apparatus 10, a server device provided in the network, or the like.

Upon performing the supervised learning as the machine learning method according to an embodiment of the disclosure, the machine learning device 100 first selects a printing speed corresponding to a learned model 421 to be generated and prepares a pre-learning model (neural network model 900) with initial weights (step S11). For example, when the printing speed SPA is selected, the learned model 421A is generated by performing learning processes using the pre-learning model, and when the printing speed SPB is selected, the learned model 421B is generated by performing learning processes using the pre-learning model.

Next, the state variable acquisition unit 110 obtains the dataset 400 of the state variables including the feature value information 401, the medium information 402, and the first control information 403 (step S12). Specifically, when the printing speed SPA is selected in step S11, the state variable acquisition unit 110 obtains the dataset 400A corresponding to the printing speed SPA, and when the printing speed SPB is selected in step S11, the state variable acquisition unit 110 obtains the dataset 400B corresponding to the printing speed SPB. The storage unit 140 stores the dataset 400 that is obtained by the state variable acquisition unit 110.

Next, the teaching data acquisition unit 120 acquires the teaching data 410 including the second control information 411 and the print defect value 412 corresponding to the dataset 400 acquired in step S12 (step S13). Specifically, when the dataset 400A is acquired in step S12, the teaching data acquisition unit 120 acquires the teaching data 410A corresponding to the acquired dataset 400A, and when dataset 400B is acquired in step S12, the teaching data acquisition unit 120 acquires the teaching data 410B corresponding to the acquired dataset 400B. The storage unit 140 stores therein the teaching data 410 that is acquired by the teaching data acquisition unit 120.

Next, in step S14, the learned model generation unit 130 inputs the feature value information 401, the medium information 402, and the first control information 403 contained in the dataset 400 obtained in step S12 into the input layer of the pre-learning model. As a result, a toner fixing temperature, a secondary transfer voltage, and a print defect value are output from the output layer of the pre-learning model.

Note that the control information (the toner fixing temperature and the secondary transfer voltage) output from the output layer is generated by the pre-learning model and thus is not usually such control information that would produce a print result that would satisfy the user's demands. Therefore, in step S15, the learned model generation unit 130 performs machine learning using the control information and the print defect value that are output from the output layer of the pre-learned model in step S14 and the second control information 411 and the print defect value 412 that are contained in the teaching data 410 obtained in step S13. The machine learning performed here is to compare the control information and the print defect value output from the output layer with the second control information 411 and the print defect value 412 contained in the teaching data 410, respectively, to obtain (calculate) the errors (the error values) between them, and adjust the weights Wi respectively associated with the nodes in the pre-learning model so that the data that reduces the errors are output from the output layer.

After the machine learning is performed in step S15, the learned model generation unit 130 determines whether it is necessary to continue the machine learning or to end the machine learning (step S16). When it is determined that the machine learning is to be continued ("No" in step S16), the learned model generation unit 130 returns to step 12. When it is determined that the machine learning is to be ended ("Yes" in step S16), the learned model generation unit 130 proceed to step S17. When it is determined that the machine learning is to be continued, the learned model generation unit 130 performs the processes of steps S12 to S15 multiple times. Usually, the accuracy of the final learned model 421 generated would be higher in proportion to the number of times the processes are repeated.

When it is determined that the machine learning is to be ended, the learned model generation unit 130 stores, as the learned model 421, the neural network model 900 generated by the neural network model 900, in which the weights Wi associated with each node are adjusted by the series of processes, in the storage unit 140 (step S17). Specifically, when the learned model 421 for printing at the printing speed SPA is generated, the learned model 421 is stored as the learned model 421A in the storage unit 140, and when the learned model 421 for printing at the printing speed SPB is generated, the learned model 421 is stored as the learned model 421B in the storage unit 140. This terminates the series of the learning processes. The learned model 421 stored here is to be applied and used in various data processing systems, the details of which are described later.

In the learning process and the machine learning method of the machine learning device described above, the machine learning is repeatedly executed on the single neural network (the pre-learning model) multiple times to generate the single learned model 421, in order to improve the accuracy thereof. However, in the disclosure, the generation method of the learned model is not limited to this. For example, a learned model to be applied to the data processing system may be generated as follows. First, a plurality of learned models, each of which has been generated by a predetermined number of machine learning operations, are stored in advance in the storage unit 140 as candidates. Next, a dataset for a validity determination is input to each of the plurality of learned models, and the accuracies of the control information output from the output layers of the plurality of learned models are compared with one another, and then one of the plurality of learned models, that is determined to be more preferable than the others and is thus to be applied to the data processing system, is selected based on the comparison. The dataset for the validity determination may have the same state variables as in the dataset 400 used for learning and may be composed of different data. In the case of comparing the accuracies of the control information output from the plurality of learned models, it is usually necessary to output actual printouts using the control information output from the plurality of learned models and check (compare) the quality of the actual printouts. However, according to an embodiment of the disclosure, the print defect value output from the plurality of learned models are compared, and thus one of the plurality of learned models, which is more preferable than the other, can be selected without actually printing.

As an experimental example, an experimental learned model, which is obtained by repeating 15,000 times of the series of the learning processes illustrated in steps S12 to S16 while changing values of the state variables is prepared. Then, 1500 sets of state variables are input into an input layer of the experimental learned model so as to obtain control information, for the 1500 sets of state variables, output from the output layer of the experimental learned model. The control information for the 1500 sets of state variables output from the output layer of the experimental learned model are compared with control information for the same 1500 sets of state variables manually identified by engineers, respectively, for a validity judgment about degrees of the errors. The results reveal that the percentage of the control information output from the output layer of the experimental learned model and the control information identified by the engineer that are substantially the same among the 1500 sets is about 90%. This confirms that the three state variables in an embodiment described above may be the most important information affecting the print result.

As explained above, the machine learning device and the machine learning method according to an embodiment described above can generate the learned model that is capable of reducing, with high accuracy, print defects that may occur when printing on various print media, such as industrial printing. Therefore, by applying the learned model described above to a real system, it becomes possible to reduce print defects with high accuracy and obtain desired print results. In addition, by using the learned model, automatic adjustment of print information can be achieved, eliminating the need for manual labor every time a print defect occurs, and making it possible to realize a low-cost data processing system. In addition, this cost reduction allows the user to easily try out multiple types of special print media for industrial printing without worrying about the cost, thus increasing the user's flexibility in selecting a print medium. Furthermore, by setting the state variables to be input to the input layer of the machine learning device to the three types of information described above, it is possible to efficiently generate highly accurate learned models that can be applied to printing on various special print media.

As described above, the machine learning device 100 according to an embodiment described above includes: the state variable acquisition unit 110 that obtains the dataset 400A of the state variables including the print result at the printing speed SPA and the dataset 400B of the state variables including the print result at the printing speed SPB; the teaching data acquisition unit 120 that obtains the teaching data 410A corresponding to the printing speed SPA and the teaching data 410B corresponding to the printing speed SPB; and the learned model generation unit 130 that generates the learned model 421A by performing machine learning based on the dataset 400A and the teaching data 410A and generates the learned model 421B by performing machine learning based on the dataset 400B and the teaching data 410B. Each of the datasets 400A and 400B includes the feature value information 401 in the actual printout AP, in which the printing has been actually made, the medium information 402, which is the information of the printing medium PM used to output the actual printout AP, and the first control information 403, which is control information for the image formation apparatus 10 when the image formation apparatus 10 outputs the actual printout AP. Each of the teaching data 410A and 410B includes: the second control information 411, which is such control information that the feature value information 401 become less than or equal to the predetermined threshold TH when printing at the corresponding printing speed SPA or SPB; and the print defect value 412 when printing using the second control information 411 at the corresponding printing speed. Accordingly, the machine learning device 100 can obtain highly accurate learned models 421A and 421B for the printing speed SPA and SPB respectively because the machine learning is performed with the information of the three state variables including the feature value information 401, the medium information 402, and the first control information 403.

Also in the machine learning device 100 according to an embodiment described above, the feature value information 401 includes the information about the print defects in the actual printout AP. Accordingly, the learned model 421 that is capable of resolving the print defects that have been occurred in the actual printout AP can be generated by the machine learning. Thus, the learned model 421 can be generated that can perform the data processing that the user desires Also in the machine learning device 100 according to an embodiment described above, the medium information 402 includes the information about the presence or absence of coating, the material, the thickness, the weight, and the density of the print medium PM. As a result, the learned model 421 can be generated that is appropriate for the print medium PM, since the various information about the print medium PM in addition to the thickness of the print medium PM are considered by the machine learning.

In the machine learning device 100 according to an embodiment described above, the first control information 403 includes the information on the toner fixing temperature and the transfer voltage (the secondary transfer voltage in this example) in the electrophotographic image formation apparatus 10 illustrated in FIG. 1, for example. Thus, since the first control information 403 includes the two types of information that may have the most impact on the print quality, the generated learned model 421 can perform the data processing that the user desires.

In the machine learning device 100 according to an embodiment described above, the second control information 411 includes the information on the toner fixing temperature and the transfer voltage (secondary transfer voltage in this example) in the electrophotographic image formation apparatus 10 illustrated in FIG. 1, for example. That is, the second control information 411 is composed of the toner fixing temperature and the transfer voltage, which are control information that are generally used in electrophotographic image formation apparatuses. Therefore, the learned model 421 can be applicable to various types of electrophotographic image formation apparatuses.

<4. Modifications of Machine Learning Device and Machine Learning Method>

In an embodiment described above, the machine learning device and the machine learning method obtain the information of the three state variables including the feature value information 401, the medium information 402, and the first control information 403. However, after further study by the inventor and others, it is found that, a highly accurate learned model can also be generated by obtaining additional information on the surrounding environment of the image formation apparatus 10 as a state variable in addition to the above-described three state variables. Therefore, as a modification, a machine learning method employing information of the four state variables is described below. A configuration of the machine learning device according to the modification described below is the same as that of an embodiment described above, except for the information acquired by the state variable acquisition unit 110. Therefore, the explanation of the same configuration is omitted below for avoiding redundancy.

The state variable acquisition unit 110 according to a modification may be configured to obtain a dataset 400 of the information of the four state variables including: the feature value information 401; the medium information 402; the first control information 403; and the environmental information 404, which is information of the environment around the image formation apparatus 10.

The environmental information 404 is information including the temperature and humidity of the surroundings of the location where the image formation apparatus 10 is installed. As a specific method of measuring the temperature and humidity, the temperature and humidity can be measured by acquiring output data from a temperature and humidity sensor installed in the image formation apparatus 10, or by acquiring output data from a temperature and humidity sensor provided separately from the image formation apparatus 10. Further, instead of these measurement methods, the temperature and humidity around the image formation apparatus 10 may be obtained by an input operation by the user directly or via a communication device. Here, the environmental information 404 corresponds to a specific example of "environmental information" in the disclosure.

The obtained feature value information 401, medium information 402, first control information 403, and environmental information 404 are then stored in the storage unit 140 as one dataset 400. Specifically, the dataset 400 that contains the print result at the printing speed SPA is stored in the storage unit 140 as the dataset 400A corresponding to the printing speed SPA, and the dataset 400 that contains the print result at the printing speed SPB is stored in the storage unit 140 as the dataset 400B corresponding to the printing speed SPB.

Figure 9:
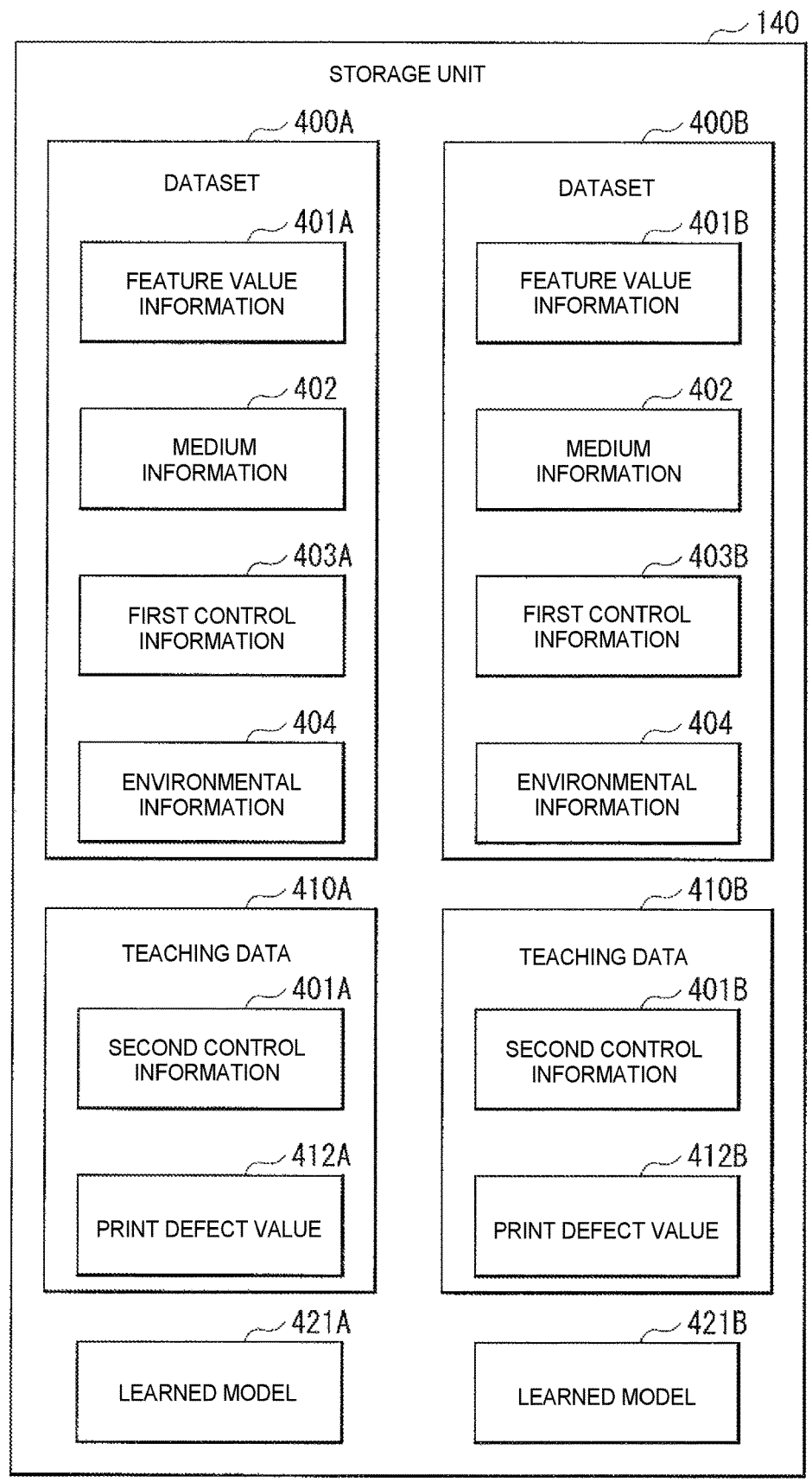
FIG. 9 is a diagram illustrating an example of data stored in a storage unit of a machine learning device according to a modification.

FIG. 9 illustrates an example of data stored in the storage unit 140 according to a modification. The dataset 400A includes the feature value information 401A, the medium information 402, the first control information 403A, and the environmental information 404. The dataset 400B includes the feature value information 401B, the medium information 402, the first control information 403B, and the environmental information 404.

Figure 10:
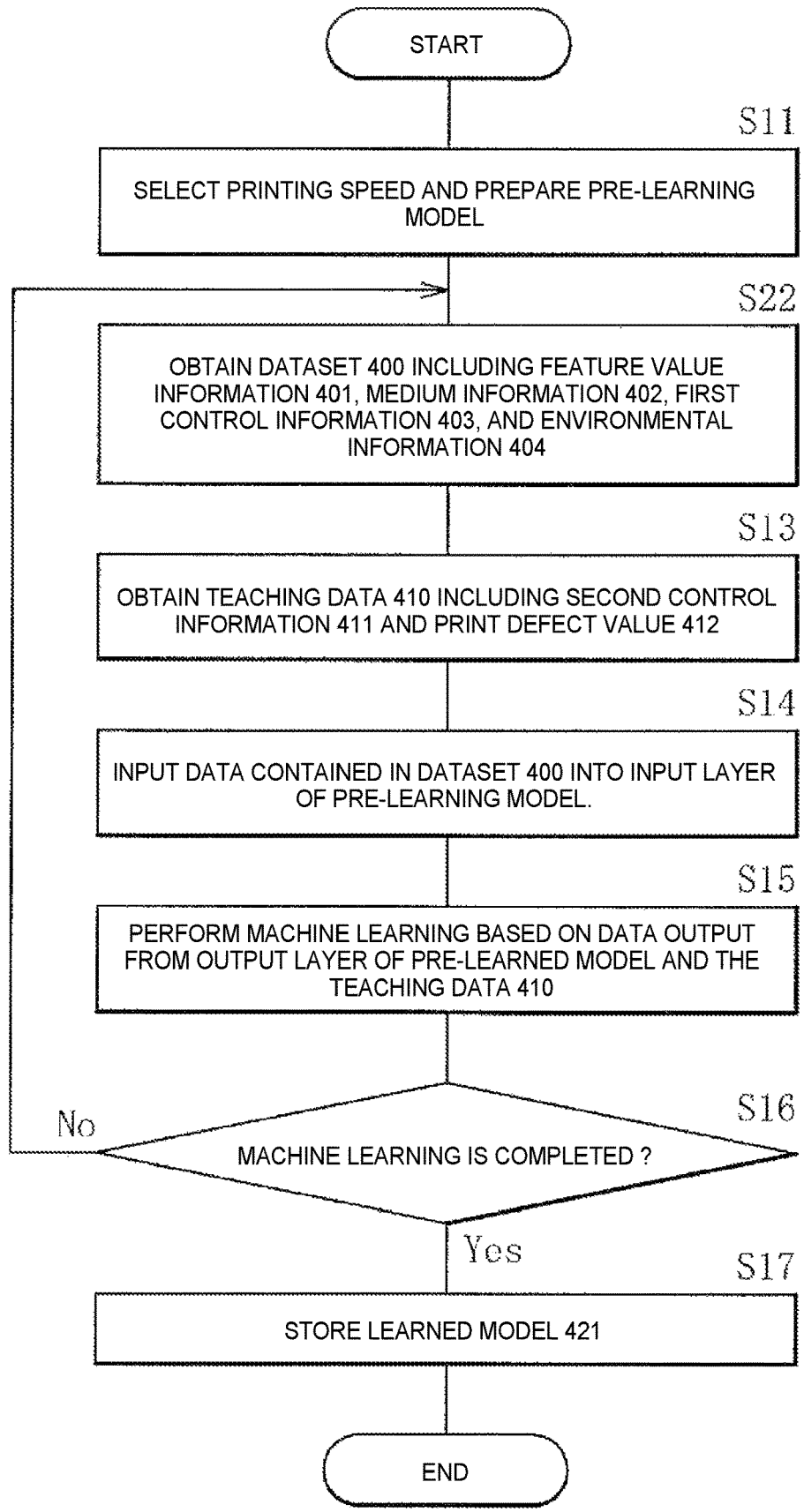
FIG. 10 is a flowchart illustrating an example of a machine learning method performed by a machine learning device according to a modification.

FIG. 10 is a flowchart illustrating a machine learning method according to a modification. As illustrated in FIG. 10, a series of processes of the machine learning method according to a modification is generally the same as the series of processes of the machine learning method according to an embodiment described above, except for step S22.

In the machine learning method according to a modification, after the learned model generation unit 130 selects the printing speed and prepares the pre-learning model, the state variable acquisition unit 110 acquires the dataset 400 of the state variables including the feature value information 401, the medium information 402, the first control information 403, and the environmental information 404 (step S22). After the dataset 400 is acquired in step S22, the teaching data acquisition unit 120 acquires the teaching data 410 corresponding to the acquired dataset 400 (step S13). The learned model generation unit 130 then inputs the feature value information 401, the medium information 402, and the first control information 403 contained in the dataset 400 obtained in step S22 into the input layer of the pre-learning model (step S14). Then, in step S15, the learned model generation unit 130 performs machine learning using the control information and the print defect value that are output from the output layer of the pre-learning model in step S14, and the second control information 411 and the print defect value 412 that are contained in the teaching data 410 obtained in step S13. This series of learning processes is executed multiple times to generate the learned model 421. In this way, the learned model 421 is generated according to the printing speed selected in step S11.

According to the above-described machine learning method, the machine learning is performed using the environmental information 404 as well, so that the machine learning can be performed in consideration of even the environment in which the image formation apparatus 10 is placed (e.g., in consideration of whether the image formation apparatus 10 is placed in a cold climate, in a dry room, etc.). Therefore, it is expected that the generated learned model 421 can adjust the control information even more accurately.

As described above, the machine learning device 100 can be built into the image formation apparatus 10 or an ordinary PC. However, especially in a case where there is a large number of input parameters for the machine learning, the amount of calculation is extremely large, so that the CPU installed in the ordinary image formation apparatus 10 or the ordinary PC alone may take a long time to generate the learned model. Therefore, when the machine learning device 100 is built into the image formation apparatus 10 or the ordinary PC, it may be preferable to take measures to shorten the calculation processing time, by adding a high-performance computing device such as a graphics processing unit (GPU), utilizing the computing power of another PC(s) and/or a server device(s) connected via a network for the machine learning calculations, or the like, for example.

As mentioned above, the selection of the state variables for the machine learning device is an important factor that directly affects the learned model generated. However, the disclosure does not intend to completely eliminate combinations other than the combination of the three state variables according to an embodiment described above and the combination of the four state variables according to a modification described above. For example, a machine learning device and a machine learning method, to which a parameter(s) whose effects are sufficiently small on the learned model generated compared to the three or four parameters employed in an embodiment or a modification described above is added, may be encompassed within the technical scope of this disclosure, since such a machine learning device and machine learning method do not substantially depart from the technical philosophy of this disclosure.

In the machine learning device 100 according to a modification described above, each of the datasets 400A and 400B of the state variables includes the environmental information 404 in addition to the feature value information 401, the medium information 402, and the first control information 403. Accordingly, the machine learning device 100 can obtain a more accurate learned model 421 by employing the four state variables including the environmental information 404 in addition to the feature value information 401, the medium information 402, and the first control information 403.

In the machine learning device 100 according to a modification described above, the environmental information 404 includes information about the temperature and humidity of the environment of the image formation apparatus 10. As a result, the temperature around the image formation apparatus 10, which affects the fixing temperature control of the image formation apparatus 10 or the like, and the humidity around the image formation apparatus 10, which affects the state of the print media PM or the like, are reflected in the learned model 421. Thus, the learned model 421 can be obtained with high accuracy in accordance with the conditions at the time of printing.

<5. Data Processing System and Data Processing Method>

Figure 11:
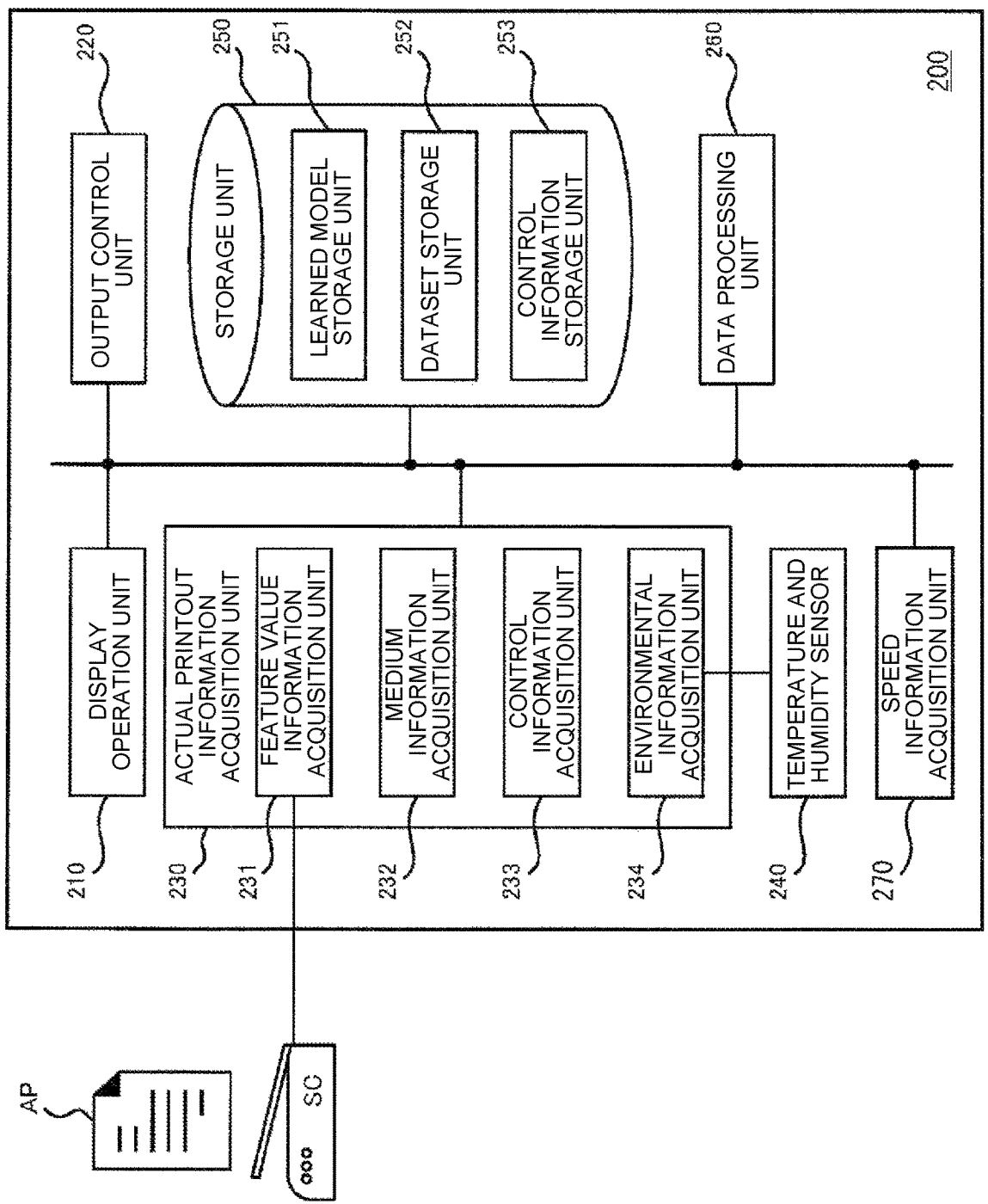
FIG. 11 is a block diagram illustrating a schematic view of a configuration example of a data processing system according to an embodiment.

Next, an application example of the learned model generated by the above-described machine learning device and machine learning method is explained. FIG. 11 is a schematic block diagram illustrating a view of a data processing system according to an embodiment. A case where a learned model generated by the machine learning method according to the above modification is applied to the image formation apparatus 200, as a data processing system according to an embodiment, is described below as an example.

The image formation apparatus 200 as the data processing system according to an embodiment is the same as or similar to the image formation apparatus 10 described in FIG. 1 and the mechanical structure thereof is generally the same as the image formation apparatus 10 illustrated in FIG. 1. Therefore, in the following description, it is assumed that the mechanical structure of the image formation apparatus 200 is as the same as in the image formation apparatus 10, and thus the reference signs used in the image formation apparatus 10 may be incorporated for explaining the image formation apparatus 200. As illustrated in FIG. 11, the image formation apparatus 200 includes a display operation unit 210, an output control unit 220, an actual printout information acquisition unit 230, a temperature and humidity sensor 240, a speed information acquisition unit 270, a storage unit 250, and a data processing unit 260. Note that the output control unit 220, the actual printout information acquisition unit 230, the speed information acquisition unit 270, the data processing unit 260, and the like may include at least a processor such as a CPU and a memory such as a RAM (Random Access Memory) and a ROM (Read Only Memory) or the like to realize functions thereof.

The display operation unit 210 includes a display or a display device including a liquid crystal panel or the like and an operation device (input device) including an operation button(s) and a touch panel or the like provided at a predetermined position of the image formation apparatus 200. The display operation unit 120 provides notifications to the user of the image formation apparatus 200 and allows the user to input operations.

The output control unit 220 controls various configurations for realizing print output by the image formation apparatus 200. The output control unit 220 controls the printing speed in the image formation apparatus 200 by, for example, controlling the rotation speeds of various rollers in the image formation apparatus 200. The output control unit 220, for example, controls the secondary transfer voltage applied to the secondary transfer roller 44. The output control unit 220 controls the toner fixing temperature, for example, by controlling the value of the current supplied to the heater inside the fixation roller 51.

The actual printout information acquisition unit 230 acquires information related to the actual printout AP (the actual printed matter AP), including print defects on the actual printout AP. The actual printout information acquisition unit 230 includes a feature value information acquisition unit 231, a medium information acquisition unit 232, a control information acquisition unit 233, and an environmental information acquisition unit 234. The various information obtained by the actual printout information acquisition unit 230 are associated with one another as one dataset 500 and stored in a dataset storage unit 252.

The feature value information acquisition unit 231 acquires the image data of the actual printout AP as feature value information 501. As illustrated in FIG. 11, the feature value information acquisition unit 231 is locally connected to a scanner SC outside the image formation apparatus 200 via an input/output interface (not illustrated). In this example, the image data of the actual printout AP read by the scanner SC is acquired as the feature value information 501.

The medium information acquisition unit 232 acquires medium information 502 of the print medium PM, for example, information regarding the presence or absence of coating, the material, the thickness, the weight, and the density of the print medium PM. This medium information 502 can be obtained by, for example, a user's input of a product code pre-assigned to the print medium PM via the display operation unit 210. The density information of the print medium PM may be information that can be identified by calculation based on the thickness and the weight (basis weight) of the print medium PM, so that a user's input for the density information is not necessarily required.

The control information acquisition unit 233 obtains first control information 503, which is control information for the image formation apparatus 200 when the image formation apparatus 200 outputs the actual printout AP. The first control information 503 is, for example, the value of the secondary transfer voltage applied to the secondary transfer roller 44 and the value of the toner fixing temperature of the fixation roller 51. The first control information 503 is information stored in a memory of the output control unit 220 or in the storage unit 250 in which control information of the output control unit 220 is stored, so that the first control information 503 can be obtained via an internal bus.

The environmental information acquisition unit 234 acquires environmental information 504, which is information of the environment around the image formation apparatus 200, such as information about the temperature and humidity around the image formation apparatus 200, for example. The environmental information 504 can be obtained by using the temperature and humidity sensor 240 built into the image formation apparatus 200, for example.

The temperature and humidity sensor 240 measures the temperature and humidity around the image formation apparatus 200.

The speed information acquisition unit 270 acquires speed information 505, which is information about the printing speed at the time of outputting the actual printout AP. The speed information 505 indicates either the printing speed SPA or SPB. The speed information 505 is stored in the memory of the output control unit 220 or in the storage unit 250 in which the control information of the output control unit 220 is stored, so that the speed information 505 can be obtained via the internal bus.

The storage unit 250 stores various information of the image formation apparatus 200 and includes a learned model storage unit 251, a dataset storage unit 252, and a control information storage unit 253.

The learned model storage unit 251 stores therein the learned models 421A and 421B generated by the machine learning method according to a modification described above. That is, each of the learned models 421A and 421B is generated by machine learning based on the dataset 400 including the feature value information 401, the medium information 402, first control information 403, and the environmental information 404.

The dataset storage unit 252 stores therein the dataset 500 of the actual printout information including the feature value information 501, the medium information 502, the first control information 503, and the environmental information 504, obtained by the actual printout information acquisition unit 230. For example, in a case of printing on thin print media PM, the dataset 500 that includes a print result at the printing speed SPA obtained by the actual printout information acquisition unit 230 is stored as a dataset 500A corresponding to the printing speed SPA. In a case of printing on thick print media PM, the dataset 500 that includes a print result at the printing speed SPB obtained by the actual printout information acquisition unit 230 is stored as a dataset 500B corresponding to the printing speed SPB. In a case of printing on medium-thickness print media PM, the dataset 500 that includes a print result at the printing speed SPA obtained by the actual printout information acquisition unit 230 is stored as a dataset 500A in association with the printing speed SPA and the dataset 500 that includes a print result at the printing speed SPB obtained by the actual printout information acquisition unit 230 is stored as a dataset 500B in association with the printing speed SPB.

The control information storage unit 253 stores therein third control information 511 (described below) generated by the data processing unit 260.

The data processing unit 260 generates, based on the dataset 500 about the specific actual printout AP stored in the dataset storage unit 252 and the learned model 421 stored in the learned model storage unit 251, control information for the image formation apparatus 200 such that a desired printout (a desired print result) can be obtained (hereinafter may be referred to as a "third control Information 511"). The third control information 511 includes the control information about the secondary transfer voltage, the toner fixing temperature, and the printing speed. The third control information 511 is such control information that can reduce print defects that have occurred in the actual printout AP. That is, the third control information 511 is adjusted by the data processing unit 260 such that a desired print result can be obtained when the image formation apparatus 200 prints using the third control information 511 on a print medium PM same as the print medium PM that was used to output the actual printout AP.

In a case of printing on the thin print medium PM, the data processing unit 260 uses the dataset 500A corresponding to the printing speed SPA, stored in the dataset storage unit 252, and the learned model 421A corresponding to the printing speed SPA, stored in the learned model storage unit 251, and input the dataset 500A into the input layer of the learned model 421A, so as to calculate the secondary transfer voltage, the toner fixing temperature, and the print defect value. The data processing unit 260 then generates the third control information 511 including the control information about the calculated secondary transfer voltage and toner fixing temperature, and the speed control information about the printing speed SPA.

Further, in a case of printing on the thick print medium PM, the data processing unit 260 uses the dataset 500B corresponding to the printing speed SPB stored in the dataset storage unit 252 and the learned model 421B corresponding to the printing speed SPB stored in the learned model storage unit 251, and inputs the dataset 500B into the input layer of the learned model 421B, so as to calculate the secondary transfer voltage, the toner fixing temperature, and the print defect value. The data processing unit 260 then generates the third control information 511 that includes the control information about the calculated secondary transfer voltage and the calculated toner fixing temperature and the speed control information about the printing speed SPB.

For example, in a case of printing on the medium-thickness print medium PM, the data processing unit 260 uses the datasets 500A and 500B stored in the dataset storage unit 252 and the learned models 421A and 421B stored in the learned model storage unit 251, inputs the dataset 500A into the input layer of the learned model 421A corresponding to the printing speed SPA to calculate the secondary transfer voltage, toner fixing temperature, and print defect value corresponding to the printing speed SPA, and inputs the dataset 500B into the input layer of the learned model 421B corresponding to the printing speed SPB to calculate the secondary transfer voltage, toner fixing temperature, and print defect value corresponding to the printing speed SPA. Then, when the print defect value calculated using the learned model 421A corresponding to the printing speed SPA is less than the print defect value calculated using the learned model 421B corresponding to the printing speed SPB, the data processing unit 260 generates the third control information 511 that includes: the control information about the secondary transfer voltage and the toner fixing temperature calculated using the learned model 421A corresponding to the printing speed SPA; and the speed control information about the printing speed SPA. To the contrary, when the print defect value calculated using the learned model 421B corresponding to the printing speed SPB is less than the print defect value calculated using the learned model 421A corresponding to the printing speed SPA, the data processing unit 260 generates the third control information 511 that includes: the control information about the secondary transfer voltage and the toner fixing temperature calculated using the learned model 421B corresponding to the printing speed SPB; and the speed control information about the printing speed SPB.

Figure 12A:
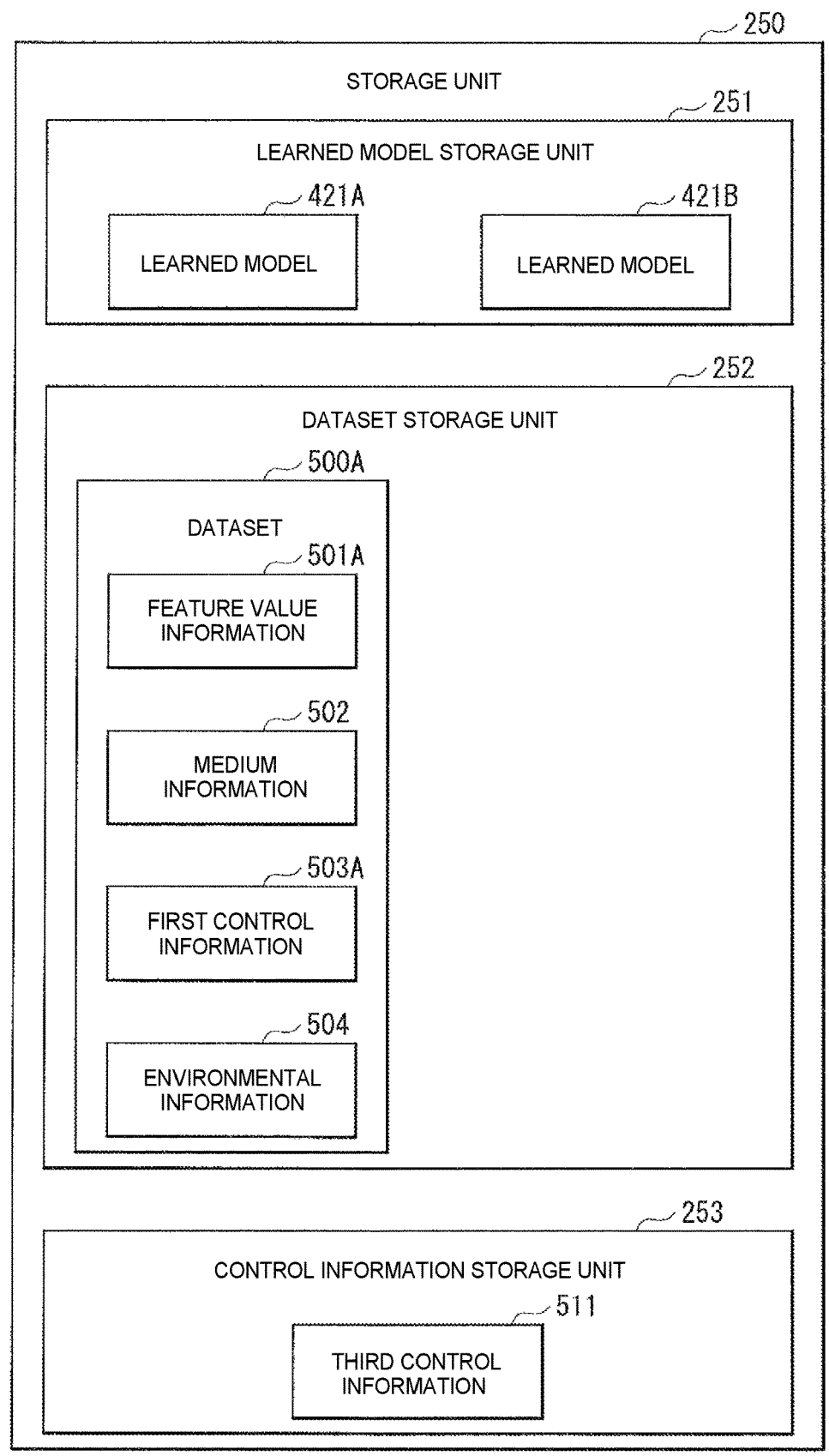
FIG. 12A is a diagram illustrating a view of an example of data stored in a storage unit such as being illustrated in FIG. 11.

FIG. 12A illustrates an example of data stored in the storage unit 250 in the case of printing on the thin print medium PM. In the case of printing on the thin print medium PM, the learned models 421A and 421B generated by the machine learning device 100 are stored in the learned model storage unit 251, the dataset 500A corresponding to the printing speed SPA is stored in the dataset storage unit 252, and the third control information 511 is stored in the control information storage unit 253. To the contrary, in the case (not illustrated) of printing on the thick print medium PM, the learned models 421A and 421B generated by the machine learning device 100 are stored in the learned model storage unit 251, the dataset 500B corresponding to the printing speed SPB is stored in the dataset storage unit 252, and the third control information 511 is stored in the control information storage unit 253.

Figure 12B:
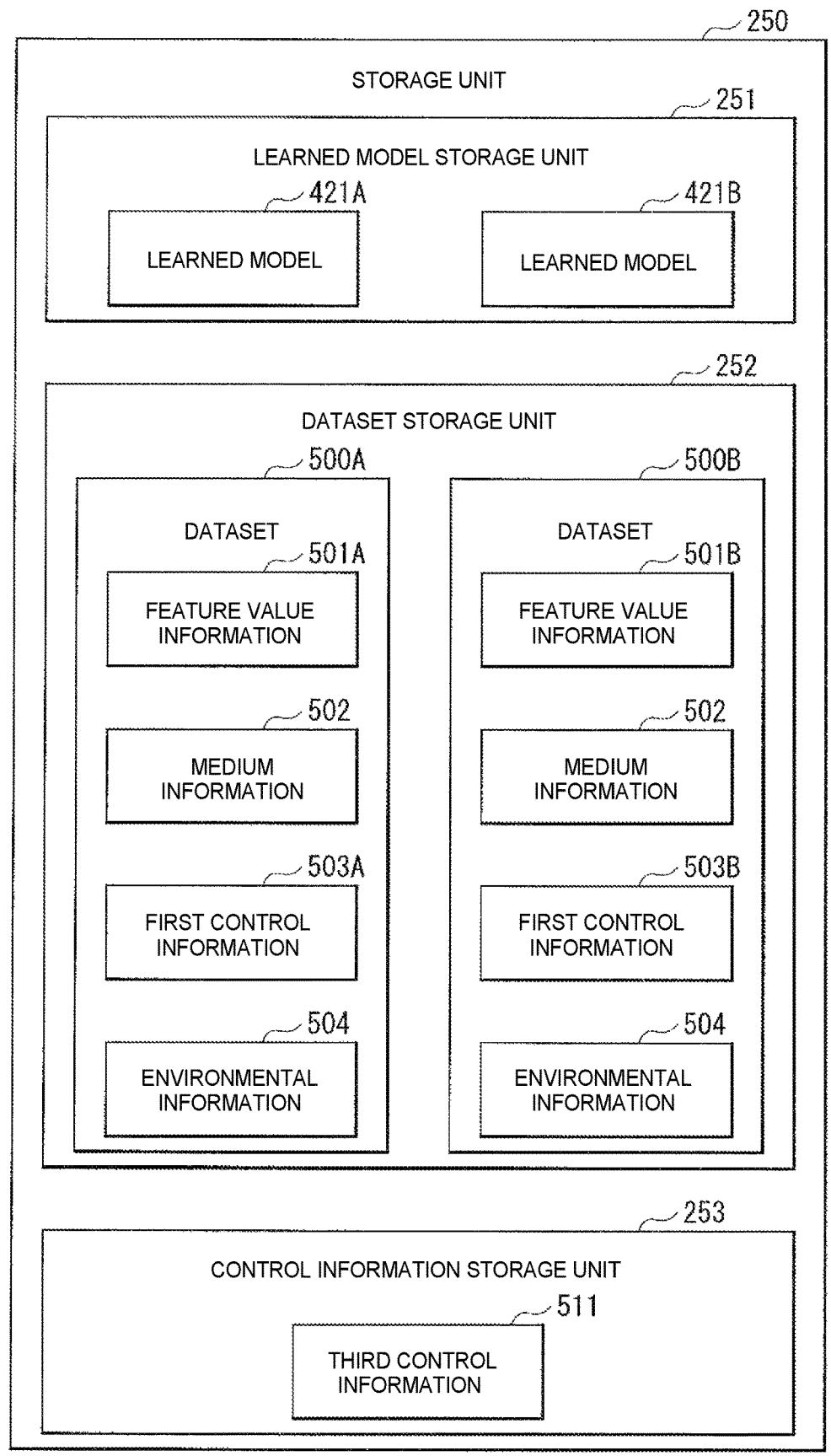
FIG. 12B is a diagram illustrating a view of another example of data stored in a storage unit such as being illustrated in FIG. 11.

FIG. 12B illustrates an example of data stored in the storage unit 250 in the case of printing on the medium-thickness print medium PM. In this case, in the dataset storage unit 252, the dataset 500A corresponding to the printing speed SPA and the dataset 500B corresponding to the printing speed SPB are stored.

The dataset 500A includes feature value information 501A, medium information 502, first control information 503A, and environmental information 504. The dataset 500B includes feature value information 501B, medium information 502, first control information 503B, and environmental information 504. The feature value information 501A includes information about the print defects in the actual printout AP when the image formation apparatus 200 has printed using the first control information 503A at the printing speed SPA, and the first control information 503A is the control information that was set in the image formation apparatus 200 in that printing. The feature value information 501B includes information about the print defects in the actual printout AP when the image formation apparatus 200 has printed using the first control information 503B at the printing speed SPB, and the first control information 503B is the control information that was set in the image formation apparatus 200 in that printing. The third control information 511 is the control information generated by the data processing unit 260.

Note that the actual printout information acquisition unit 230 corresponds to a specific example of an "actual printout information acquisition unit" in the disclosure. The data processing unit 260 corresponds to a specific example of a "data processing unit" in the disclosure. The control information storage unit 253 corresponds to a specific example of a "control information storage unit" in the disclosure. The dataset 500A corresponds to a specific example of a "first dataset" in the disclosure. The dataset 500B corresponds to a specific example of a "second dataset" in the disclosure. The feature value information 501 corresponds to a specific example of "feature value information" in the disclosure. The medium information 502 corresponds to a specific example of "medium information" in the disclosure. The first control information 503 corresponds to a specific example of "first control information" in the present disclosure. The environmental information 504 corresponds to a specific example of "environmental information" in the disclosure. The third control information 511 corresponds to a specific example of "third control information" in the disclosure.

Figure 13:
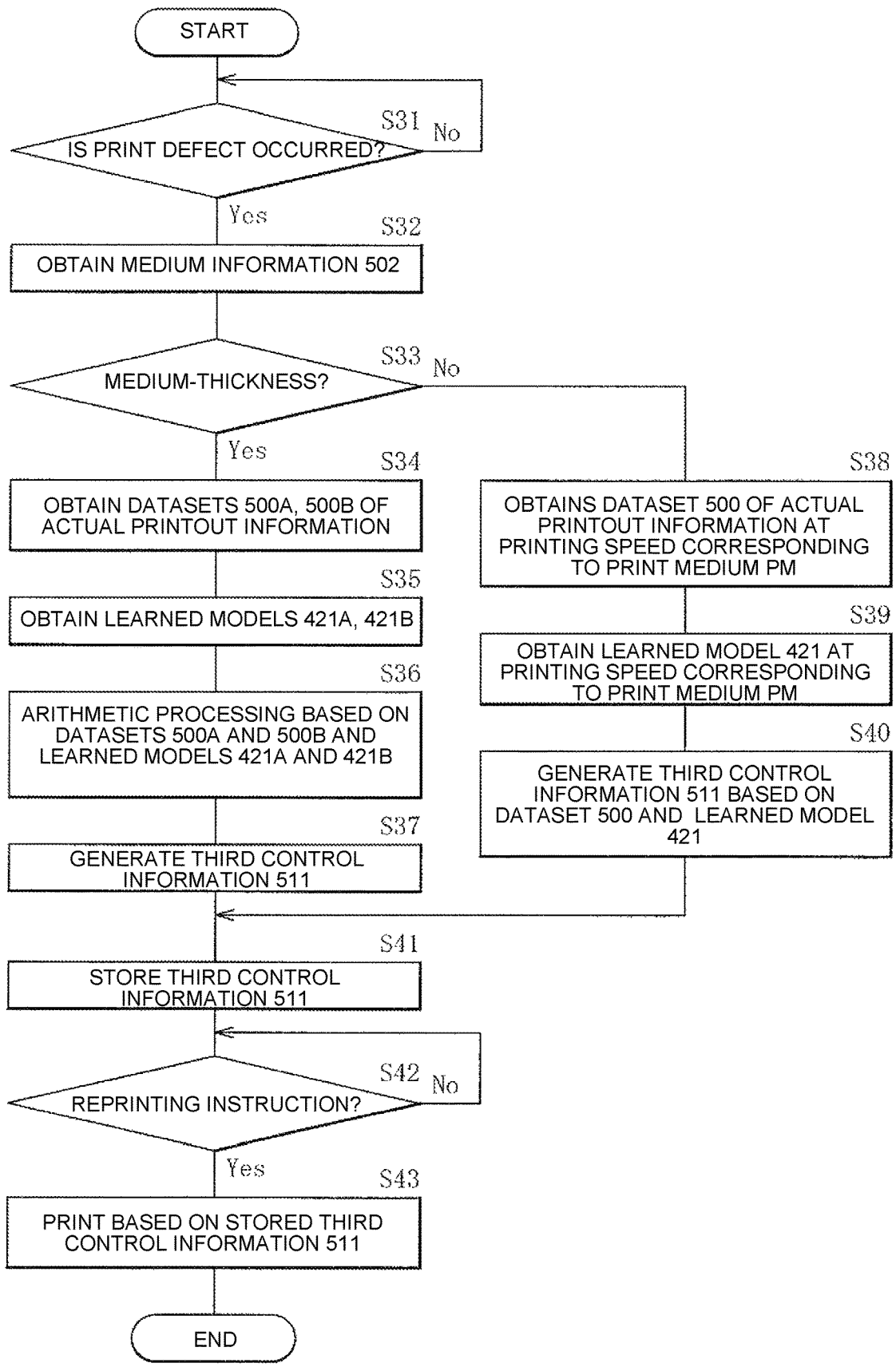
FIG. 13 is a flowchart illustrating an example of a data processing method performed by the data processing system such as being illustrated in FIG. 11.

In connection with the data processing system described above, a data processing method performed by the data processing unit 260 is described below with reference to FIG. 13. FIG. 13 is a flowchart illustrating a data processing method performed in the data processing unit of the data processing system according to an embodiment.

As illustrated in FIG. 13, when no print defect has occurred ("No" in step S31), the data processing unit 260 maintains the standby state, and when a print defect has occurred ("Yes" in step S31), the data processing unit 260 proceeds to the subsequent data processing. Whether or not a print defect has occurred is determined based on a report by the user. Specifically, whether or not a print defect has occurred is determined based a report (an instruction) that the user wants to resolve the print defect (improve the print quality), for example, via the display operation unit 210 of the image formation apparatus 200 or to via a customer service or the like that manages the image formation apparatus 200. In an embodiment, the image formation apparatus 200 includes various configurations such that the image formation apparatus 200 by itself can resolve the print defects. Therefore, in terms of convenience, it may be preferable that the image formation apparatus 200 is equipped with a specific mode, such as a print defect resolution mode, for example. In this case, the user selects the print defect resolution mode via the display operation unit 210 or the like, and the following process is performed to resolve the print defect.

When it is determined that a print defect has occurred, the image formation apparatus 200 requests the user to input the medium information 502 of the print medium PM on which the print defect has occurred via a predetermined user interface such as the display operation unit 210 or the like. Specifically, the image formation apparatus 200 requests (prompts) the user to input the medium information by, for example, displaying a method of acquiring various information on the display operation unit 210 or outputting a navigation voice via an audio output interface (not illustrated). The medium information 502 input by the user in response to this request is acquired by the medium information acquisition unit 232 and stored in the dataset storage unit 252. The data processing unit 260 then obtains the medium information 502 by referring to the dataset storage unit 252 (step S32).

Next, the data processing unit 260 checks whether the thickness of the print medium PM is medium-thickness or not based on the medium information 502 (step S33). The data processing unit 260 can determine whether the print medium PM is one of thin print media, thick print media, and medium-thickness print media based on information about, for example, the thickness of the print medium PM and the presence or absence of coating of the print medium PM included in the medium information 502. A defined range of the medium thickness of the print medium PM is established empirically by conducting printing experiments.

When the thickness of the print medium PM is the medium-thickness ("Yes" in step S33), the image formation apparatus 200 requests (prompts) the user to input the feature value information 501A corresponding to the printing speed SPA and the feature value information 501B corresponding to the printing speed SPB. The feature value information 501A corresponding to the printing speed SPA, input by the user in response to this request, is stored into the dataset storage unit 252, together with the medium information 502 obtained in step S32, the first control information 503A corresponding to the printing speed SPA, obtained by the control information acquisition unit 233, and the environmental information 504 obtained by the environmental information acquisition unit 234, as a dataset 500A corresponding to the printing speed SPA. Also, the feature value information 501B corresponding to the printing speed SPB, input by the user in response to this request, is stored into the dataset storage unit 252, together with the medium information 502 obtained in step S32, the first control information 503B corresponding to the printing speed SPB, obtained by the control information acquisition unit 233, and the environmental information 504 obtained by the environmental information acquisition unit 234, as a dataset 500B corresponding to the printing speed SPB. The data processing unit 260 obtains the datasets 500A and 500B of the actual printout information (the actual printed matter information) by referring to the dataset storage unit 252 (step S34).

Next, the data processing unit 260 obtains the learned models 421A and 421B by referring to the learned model storage unit 251 (step S35).

Next, in step S36, the data processing unit 260 performs arithmetic processing based on the datasets 500A and 500B obtained in step S34 and the learned models 421A and 421B obtained in step S35. Specifically, the data processing unit 260 inputs the dataset 500A into the input layer of the learned model 421A so as to calculate the secondary transfer voltage, the toner fixing temperature, and the print defect value by using the learned model 421A and inputs the dataset 500B into the input layer of the learned model 421B so as to calculate the secondary transfer voltage, the toner fixing temperature, the and the print defect value by using the learned model 421B.

Next, the data processing unit 260 generates the third control information 511 (step S37). Specifically, in the step S37, when the print defect value calculated with the learned model 421A corresponding to the printing speed SPA is less than the print defect value calculated with the learned model 421B corresponding to the printing speed SPB, the data processing unit 260 generates the third control information 511 that includes: the control information about the secondary transfer voltage and the toner fixing temperature calculated with the learned model 421A corresponding to the printing speed SPA; and the speed control information about the printing speed SPA. To the contrary, when the print defect value calculated with the learned model 421B corresponding to the printing speed SPB is less than the print defect value calculated with the learned model 421A corresponding to the printing speed SPA, the data processing unit 260 generates the third control information 511 that includes: the control information about the secondary transfer voltage and the toner fixing temperature calculated with the learned model 421B corresponding to the printing speed SPB; and the speed control information about the printing speed SPB.

In step S33, when the thickness of the print medium PM is not the medium-thickness ("No" in step S33), the image formation apparatus 200 requests (prompts) the user to input the feature value information 501 at the printing speed corresponding to the print medium PM. Specifically, for example, in a case where the print medium PM is a thin print medium, the image formation apparatus 200 requests (prompts) the user to input the feature value information 501A corresponding to the printing speed SPA based on the speed information 505 obtained by the speed information acquisition unit 270. The feature value information 501A corresponding to the printing speed SPA, input by the user in response to this request, is then stored into the dataset storage unit 252, together with the medium information 502 obtained in step S32, the first control information 503A corresponding to the printing speed SPA, obtained by the control information acquisition unit 233, and the environmental information 504 obtained by the environmental information acquisition unit 234, as a dataset 500A corresponding to the printing speed SPA. To the contrary, in a case where the print medium PM is a thick print medium, the image formation apparatus 200 requests the user to input the feature value information 501B corresponding to the printing speed SPB based on the speed information 505 obtained by the speed information acquisition unit 270. The feature value information 501B corresponding to the printing speed SPB, input by the user in response to this request, is stored into the dataset storage unit 252, together with the medium information 502 obtained in step S32, the first control information 503B corresponding to the printing speed SPB, obtained by the control information acquisition unit 233, and the environmental information 504 obtained by the environmental information acquisition unit 234, as a dataset 500B corresponding to the printing speed SPB. By referring to this dataset storage unit 252, the data processing unit 260 obtains the dataset 500 of the actual printout information at the printing speed corresponding to the print medium PM (step S38).

Next, by referring to the learned model storage unit 251, the data processing unit 260 obtains the learned model 421 for the printing speed corresponding to the print medium PM (step S39). Specifically, for example, in the case where the print medium PM is a thin print medium, the data processing unit 260 obtains the learned model 421A corresponding to the printing speed SPA. To the contrary, in the case where the print medium PM is a thick print medium, the data processing unit 260 obtains the learned model 421B corresponding to the printing speed SPB.

Next, in step S40, the data processing unit 260 generates the third control information 511 by performing arithmetic processing based on the dataset 500 obtained in step S38 and the learned model 421 obtained in step S39. Specifically, when the dataset 500A is acquired in step S38 and the learned model 421A is acquired in step S39, the data processing unit 260 inputs the dataset 500A into the input layer of the learned model 421A, so as to calculate the secondary transfer voltage, the toner fixing temperature, and the print defect value by using the learned model 421A. The data processing unit 260 then generates the third control information 511 including the control information about the calculated secondary transfer voltage and toner fixing temperature, and the speed control information about the printing speed SPA. To the contrary, when the dataset 500B is acquired in step S38 and the learned model 421B is acquired in step S39, the data processing unit 260 inputs the dataset 500B into the input layer of the learned model 421B, so as to calculate the secondary transfer voltage, the toner fixing temperature, and the print defect value by using the learned model 421B. The data processing unit 260 then generates the third control information 511 including the control information about the calculated secondary transfer voltage and toner fixing temperature and the speed control information about the printing speed SPB.

When the third control information 511 is generated, the data processing unit 260 stores the third control information 511 once in the control information storage unit 253 (step S41) and waits for a reprinting instruction by the user (step S42). Then, when a reprinting instruction is input, for example, through the display operation unit 210 by the user, the output control unit 220 refers to the third control information 511 in the control information storage unit 253 instead of the first control information 503, sets the printing speed and adjusts the secondary transfer voltage applied to the secondary transfer roller 44 and the toner fixing temperature of the fixation roller 51, and performs printing again (step S43).

Specifically, for example, in the case where the print medium PM is the thin print medium, the output control unit 220 adjusts the secondary transfer voltage applied to the secondary transfer roller 44 and the toner fixing temperature of the fixation roller 51 based on the third control information 511, and executes printing at the printing speed SPA indicated by the speed control information contained in the third control information 511. Further, in the case where the print medium PM is the thick print medium, the output control unit 220 adjusts the secondary transfer voltage applied to the secondary transfer roller 44 and the toner fixation temperature of the fixation roller 51 based on the third control information 511, and executes printing at the printing speed SPB indicated by the speed control information contained in the third control information 511. Furthermore, in the case where the print medium PM is the medium-thickness print medium, the output control unit 220 adjusts the secondary transfer voltage applied to the secondary transfer roller 44 and the toner fixing temperature of the fixation roller 51 based on the third control information 511, and executes printing at one of the printing speeds SPA and SPB indicated by the speed control information included in the third control information 511.

Because the printout (the printed matter) output by the reprinting through the above described processes is output based on the third control information 511 that has been adjusted based on the previous print result, the print defect that has been occurred in the actual printout AP at the last time is generally resolved. Thus, in the data processing system according to an embodiment of the disclosure, the data processing system does not require any manpower, such as an engineer EN, at all between the occurrence of the print defect and the user's acquisition of the printout in which the print defect has been resolved. Therefore, the data processing system according to an embodiment can realize data processing at low cost. In most cases, it is possible to obtain a print result in which the print defect has been resolved on the printout reprinted through the above described series of processes. However, there is a slight possibility that a print defect still occurs after the above described series of processes. In such a case, the processes illustrated in steps S32 to S43 may be performed again.

In addition, the method of acquiring information by the configurations in the actual printout information acquisition unit 230 is not limited to the method described above. For example, the feature value information acquisition unit 231 may obtain the feature value information 501, by receiving the image data of the actual printout AP read by an imaging device other than a scanner (e.g., a camera function built into a smartphone, an image reading sensor installed at the discharge port or the like in the image formation apparatus, etc.) via the Internet, or the like. Further, instead of obtaining the product code of the print medium PM, the medium information acquisition unit 232 may obtain the medium information 502 by receiving information input by the user, such as information acquired by the user through actual measurement, through the interactive process via the display operation unit 210 or a predetermined application software, or may automatically obtain the medium information 502 inside the image formation apparatus 200 for example by employing various sensors in the image formation apparatus 200 that automatically obtain the medium information 502 of the print medium PM. Furthermore, instead of acquiring temperature and humidity information from the temperature and humidity sensor 240 built into the image formation apparatus 200, the environmental information 504 may be obtained by acquiring the output of a temperature and humidity sensor provided separately from and outside of the image formation apparatus 200, or by acquiring temperature and humidity information through an input operation by the user.

In an embodiment described above, the image formation apparatus 200 is equipped with the environmental information acquisition unit 234 and the temperature and humidity sensor 240, but does not necessarily have to have these. However, in that case, the information of the three state variables including the feature value information 501, the medium information 502, and the first control information 503 without the environmental information are acquired by the actual printout information acquisition unit 230. Therefore, in order to correspond to this, it can be clearly understood by one of skill in the art that a learned model 421, that has been generated by performing machine learning with the information of the three state variables including the feature value information 401, the medium information 402, and the first control information 403, is stored in the learned model storage unit 251 and is retrieved by the data processing unit 260.

Furthermore, in an embodiment described above, the image formation apparatus 200 forming the data processing system is an intermediate transfer full-color LED (Light Emitting Diode) printer. However, instead of the printer, a digital multifunctional machine further equipped with a function(s) other than the printer, such as a scanner function and a facsimile function may be employed. In this case, since the digital multifunctional machine itself is equipped with a scanner function, there is no need to use the external scanner SC described above when acquiring the feature value information 501. Thus, in this case, the digital multifunctional machine that is completely offline can be the data processing system according to an embodiment.

As described above, the data processing system according to an embodiment includes: the actual printout information acquisition unit 230 that acquires the dataset 500A of the actual printout information including the print result at the printing speed SPA and the dataset 500B of the actual printout information including the print result at the printing speed SPB; the data processing unit 260 that outputs the third control information 511 based on the datasets 500A and 500B and the learned models 421A and 421B; and the control information storage unit 323 that stores the third control information 511. Each of the datasets 500A and 500B includes: the feature value information 501 about the actual printout AP; the medium information 502 of the print medium PM used to output the actual printout AP; and the first control information 503, which is the control information for the image formation apparatus 200 when the actual printout AP is output. Thus, by using the learned models 421A and 421B, the control information can be adjusted automatically without going through an adjustment process by the engineer EN. Therefore, the data processing that can resolve the print defect occurred in the actual printout AP can be realized at low cost and with high accuracy.

Further, in the data processing system according to an embodiment, the data processing unit 260 inputs the information contained in the dataset 500A into the learned model 421A so as to calculate the control information for the image formation apparatus 200 and the print defect value in the case of printing using the control information calculated by the learned model 421A, and inputs the information contained in the dataset 500B into the learned model 421B so as to calculate the control information for the image formation apparatus 200 and the print defect value in the case of printing using the control information calculated by the learned model 421B. Then, when the print defect value calculated with the learned model 421A is less than the print defect value calculated with the learned model 421B, the data processing unit 260 outputs the third control information 511 that includes the control information calculated with the learned model 421A and the speed control information indicating the printing speed SPA, whereas when the print defect value calculated with the learned model 421B is less than the print defect value calculated with the learned model 421A, the data processing unit 260 outputs the third control information 511 that includes the control information calculated with the learned model 421B and the speed control information indicating the printing speed SPB. Accordingly, the data processing system selects one of the two learned models 421A and 421, which has a higher prediction accuracy than the other of the two learned models 421A and 421B, and sets the printing speed accordingly, so that the print quality can be improved.

Further, in the data processing system according to an embodiment, the dataset 500 of the actual printout information includes the feature value information 501, the medium information 502, and the first control information 503, as well as the environmental information 504. Accordingly, the control information can be adjusted according to the temperature and humidity of the environment around the image formation apparatus 10, so that the print quality can be further improved according to the situation at the time of printing.

<6. Modification of Data Processing System and Data Processing Method>

In the data processing system according to an embodiment described above, the image formation apparatus 200 includes the learned model storage unit 251 inside the image formation apparatus 200 and performs the data processing for resolving the print defect almost entirely inside the image formation apparatus 200. However, the disclosure is not limited to this. Therefore, a modification in which a series of data processing is performed outside the image formation apparatus is described below. In the following modification, only portions that are different from the data processing system according to an embodiment described above are described, and the description of common configurations, functions, etc. are omitted for avoiding redundancy.

Figure 14:
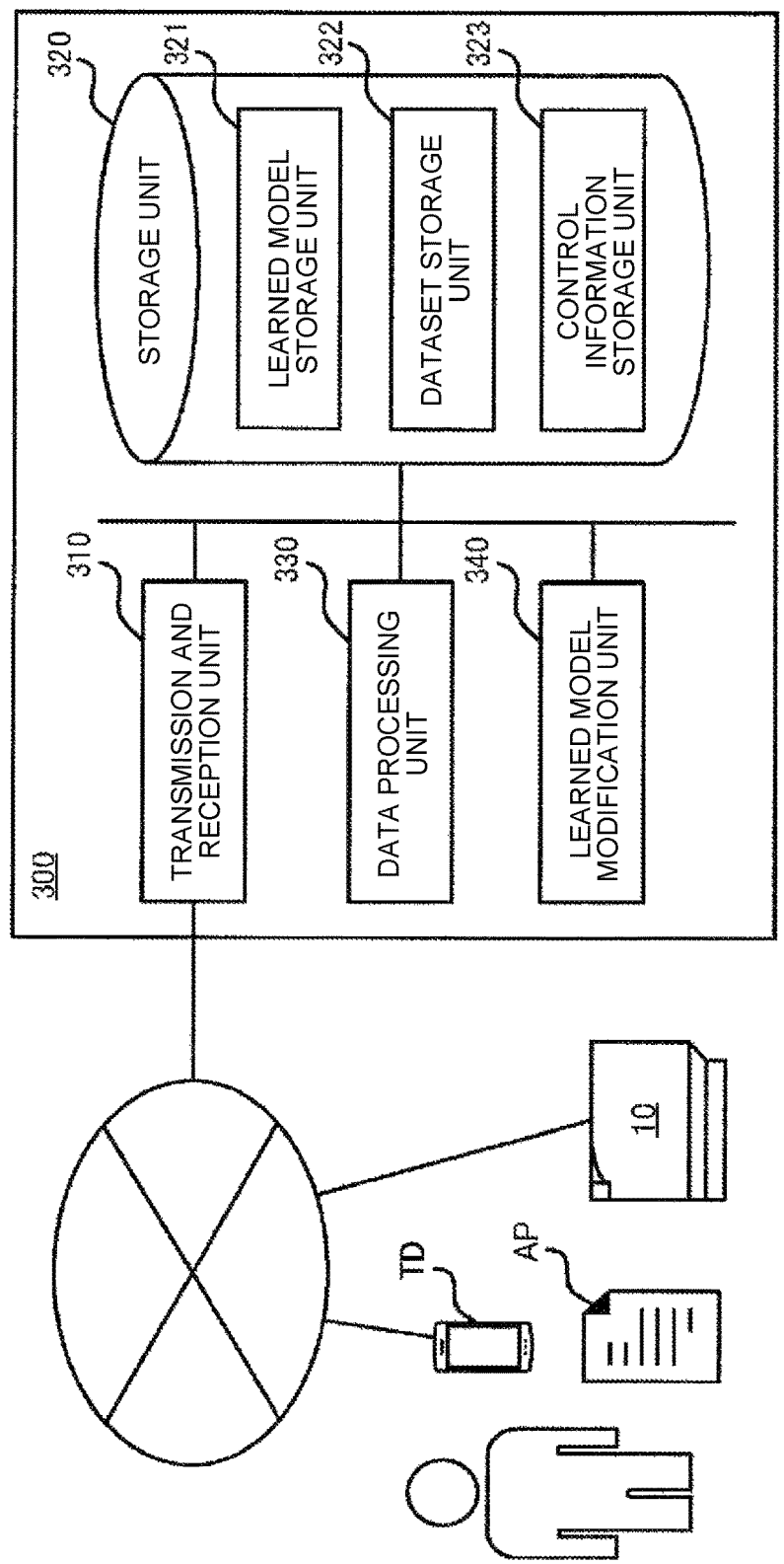
FIG. 14 is a block diagram illustrating a schematic view of a configuration example of a data processing system according to a modification.

FIG. 14 is a schematic block diagram of a data processing system according to a modification. As illustrated in FIG. 14, the data processing system according to a modification includes a server device 300 connected to the internet. A plurality of terminal devices TD (e.g., a smartphone, a tablet device, a PC, etc.) and an image formation apparatus 10 are connected to the server device 300 via the internet.

The server device 300 is equipped with a transmission and reception unit 310, a storage unit 320, a data processing unit 330, and a learned model modification unit 340. The transmission and reception unit 310 obtains the dataset 500 of the actual printout information and feedback information transmitted from one or both of the terminal device TD and the image formation apparatus 10, and transmits the third control information 511, described below, to one or both of the terminal device TD and the image formation apparatus 10. Various methods can be adopted for transmitting the dataset 500 to the transmission and reception unit 310. For example, the feature value information 501 and the medium information 502 are transmitted via an application (software) pre-installed in the terminal device TD, and the first control information 503 and the environmental information 504 are transmitted from the image formation apparatus 10 in response to an operation of the application in the terminal device TD. Further, the third control information 511 transmitted by the transmission and reception unit 310 may be sent to the image formation apparatus 10 so that the image formation apparatus 10 reflects the third control information 511. Furthermore, the third control information 511 transmitted by the transmission and reception unit 310 may sent to the terminal device TD and the information received by the terminal device TD may be input into the image formation apparatus 10 by the user, so that the image formation apparatus 10 reflects the third control information 511.

The storage unit 320 stores various information in the server device 300, and includes a learned model storage unit 321, a dataset storage unit 322, and a control information storage unit 323. The learned model storage unit 321 stores a plurality of learned models 421 so as to be compatible with various actual printout information and various image formation apparatuses. Here, it may be preferable that the plurality of learned models 421 are prepared for plural types of image formation apparatuses with different printing methods, functions, and the like, in order to support the plural types of image formation apparatuses. The dataset storage unit 322 stores the feature value information 501, the medium information 502, and the first control information 503 pertaining to the common actual printout AP, and the environmental information 504, received by the transmission and reception unit 310, as one dataset 500. The control information storage unit 323 stores therein the third control information 511 output by the data processing unit 330 as described below.

The data processing unit 330 uses a specific dataset 500 received by the transmission and reception unit 310 and stored in the dataset storage unit 322, and a single learned model 421 identified based on the content of the dataset 500, the type of the image formation apparatus, and/or the like out of a plurality of learned models 421 stored in the learned model storage unit 251, and thus inputs the specific dataset 500 into the input layer of the single learned model 421, so as to output, from the output layer, the transfer voltage and the toner fixing temperature as the third control information 511.

The learned model modification unit 340 uses the feedback information received by the transmission and reception unit 310 and modifies, based on the received feedback information, the corresponding learned model 421 in the learned model storage unit 321 for higher accuracy. The feedback information is information sent by one or both of the terminal unit TD and the image formation apparatus 10 when the reprinting based on the third control information 511 output by the data processing unit 330 did not reduce or resolve the print defect or when another print defect occurred on the reprinted printout, etc. The learned model modification unit 340 uses the feedback information as a dataset for learning for the corresponding learned model 421, enabling the learned model 421 once stored in the learned model storage unit 321 to be modified at any time.

Since the data processing method with the server device 300 according to a modification is generally the same as the method illustrated in FIG. 13, except that communication via the internet is used for obtaining the dataset 500 of the actual printout information and for applying the third control information 511, the description of the date processing method is omitted here for avoid redundancy.

As described above, the data processing system according to a modification realizes the data processing by the server device 300, and therefore the data processing can be easily applied to existing image formation apparatuses. In addition, the server device 300 according to a modification is equipped with the learned model modification unit 340, which allows the learned model 421 to be updated at any time. Therefore, the accuracy of the data processing can be always improved, thus providing optimal data processing results.

The data processing system according to a modification is described using the single server device 300 for convenience of explanation, but the number of server devices is not limited in this disclosure. It is also possible to provide the data processing system in the form of a cloud service.

As described above, such as being illustrated in FIG. 14, the data processing system according to a modification includes: the actual printout information acquisition unit (the transmission and reception unit 310) that obtains the dataset 500 of the actual printout information including the feature value information 501, the medium information 502, and the first control information 503; and the data processing unit 330 that outputs the third control information 511 by inputting the dataset 500 into the learned model generated by the above-described machine learning device 100; and the control information storage unit 323 that store therein the third control information 511 output from the data processing unit 330. Thus, by using the learned model 421 in this way, the control information can be adjusted automatically without going through the adjustment process by the engineer EN. Therefore, the data processing that can resolve the print defect in the actual printout AP can be realized at low cost and with high accuracy.

The invention includes other embodiments or modifications in addition to the above-described one or more embodiments and modifications without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A machine learning device comprising a processor configured with a program to perform operations comprising:
   operation as a state variable acquisition unit that acquires a first state variable dataset including a print result at a first printing speed by an image formation apparatus, and a second state variable dataset including a print result at a second printing speed by the image formation apparatus, wherein the image formation apparatus is capable of printing at a plurality of printing speeds including the first printing speed and the second printing speed;
   operation as a teaching data acquisition unit that acquires first teaching data corresponding to the first printing speed and second teaching data corresponding to the second printing speed; and
   operation as a learned model generation unit that generates a first learned model by performing machine learning based on the first state variable dataset and the first teaching data, and generates a second learned model by performing machine learning based on the second state variable, dataset and the second teaching data, wherein
   each of the first state variable dataset and the second state variable dataset includes: feature value information in an actual printout in which printing is actually made; medium information, which is information of a print medium used to output the actual printout; and first control information, which is control information of the image formation apparatus when the image formation apparatus outputs the actual printout, and
   each of the first teaching data and the second teaching data includes: second control information, which is control information such that the feature value information become less than or equal to a predetermined threshold when the printing is made at a corresponding one of the first and second printing speeds; and a print defect value in a case of printing at the corresponding one of the first and second printing speed using the second control information.

2. The machine learning device according to claim 1, wherein the feature value information includes information about a print defect in the actual printout.

3. The machine learning device according to claim 1, wherein the medium information includes information on a presence or absence of coating, a material, a thickness, a weight, and a density of the print medium.

4. The machine learning device according to claim 1, wherein the image formation apparatus is an electrophotographic image formation apparatus, and the first control information includes information about a toner fixing temperature and a transfer voltage in the image formation apparatus.

5. The machine learning device according to claim 1, wherein, the image formation apparatus is an electrophotographic image formation apparatus, and the second control information includes information about a toner fixing temperature and a transfer voltage in the image formation apparatus.

6. The machine learning device according to claim 1, wherein the image formation apparatus is an electrophotographic image formation apparatus, and each of the first control information and the second control information includes information about a toner fixing temperature and a transfer voltage in the image formation apparatus.

7. The machine learning device according to claim 1, wherein, each of the first state variable dataset and the second state variable dataset further includes environmental information around the image formation apparatus.

8. The machine learning device according to claim 7, wherein, the environmental information includes information about a temperature and a humidity around the image formation apparatus.

* * * * *